United States Patent
Go et al.

(10) Patent No.: US 11,784,768 B2
(45) Date of Patent: Oct. 10, 2023

(54) METHOD AND APPARATUS FOR TRANSMITTING AND RECEIVING UPLINK SIGNAL IN WIRELESS COMMUNICATION SYSTEM

(71) Applicant: LG ELECTRONICS INC., Seoul (KR)

(72) Inventors: Seongwon Go, Seoul (KR); Hyungtae Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 17/323,904

(22) Filed: May 18, 2021

(65) Prior Publication Data

US 2021/0367727 A1 Nov. 25, 2021

(30) Foreign Application Priority Data

May 19, 2020 (KR) .................. 10-2020-0059918

(51) Int. Cl.
*H04L 5/00* (2006.01)
*H04W 72/044* (2023.01)

(52) U.S. Cl.
CPC ......... *H04L 5/0048* (2013.01); *H04W 72/046* (2013.01)

(58) Field of Classification Search
CPC ..... H04L 5/0048; H04L 5/0055; H04L 5/005; H04W 72/046; H04B 7/0404; H04B 7/0695; H04B 7/0456
See application file for complete search history.

(56) References Cited

U.S. PATENT DOCUMENTS

| | | | |
|---|---|---|---|
| 2013/0077571 A1* | 3/2013 | Papasakellariou | H04W 52/325 370/328 |
| 2017/0366377 A1* | 12/2017 | Papasakellariou | H04L 27/2613 |
| 2019/0007854 A1* | 1/2019 | Chen | H04L 5/0091 |
| 2019/0364438 A1* | 11/2019 | Yang | H04L 27/2602 |
| 2020/0366429 A1* | 11/2020 | Huang | H04W 72/085 |
| 2020/0367217 A1* | 11/2020 | Wang | H04B 7/0639 |
| 2021/0168006 A1* | 6/2021 | Chen | H04W 24/10 |
| 2022/0052832 A1* | 2/2022 | Ersbo | H04L 5/0062 |
| 2022/0200757 A1* | 6/2022 | Guo | H04L 5/0094 |

(Continued)

OTHER PUBLICATIONS

U.S. Appl. No. 62/887,511, filed Aug. 15, 2019 (Year: 2019).*

*Primary Examiner* — Ian N Moore
*Assistant Examiner* — Sun Jong Kim
(74) *Attorney, Agent, or Firm* — LEE HONG DEGERMAN KANG & WAIMEY

(57) ABSTRACT

A method and an apparatus for transmitting and receiving an uplink signal in a wireless communication system. A method of transmitting an uplink signal includes receiving configuration information related to a sounding reference signal (SRS) from a base station; and transmitting the SRS to the base station in one or more SRS resources in a SRS resource set configured by the configuration information. Based on time domain bundling between the SRS and an uplink demodulation reference signal (DMRS) being indicated, the SRS and the uplink DMRS are transmitted on the same antenna port and/or with the same spatial domain transmission filter.

17 Claims, 13 Drawing Sheets

(56) References Cited

U.S. PATENT DOCUMENTS

2022/0224567 A1* 7/2022 Zhang .................. H04B 7/0456
2023/0134803 A1* 5/2023 Khoshnevisan ..... H04B 7/0408
370/329

* cited by examiner

[FIG. 1]
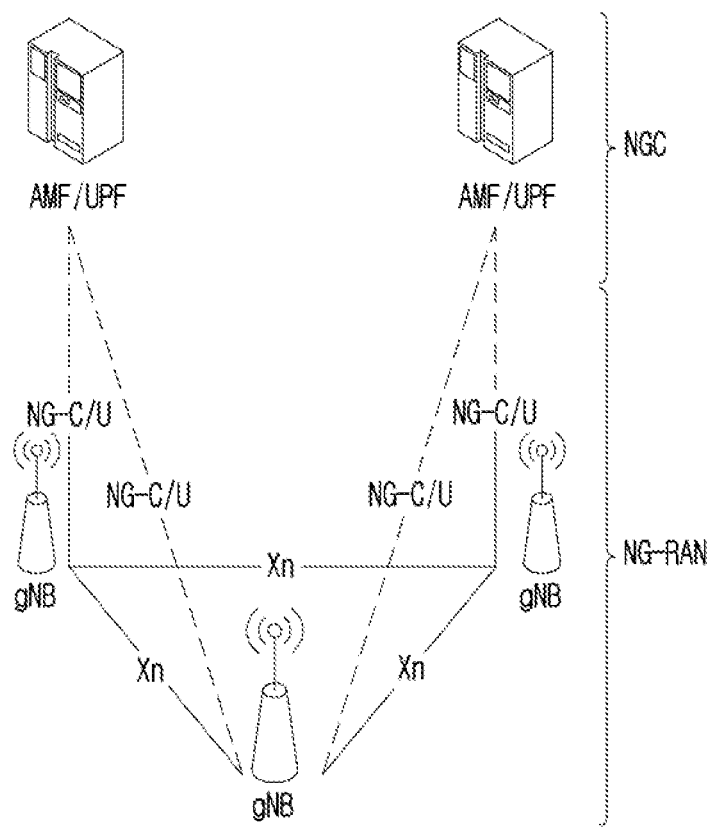

[FIG. 2]
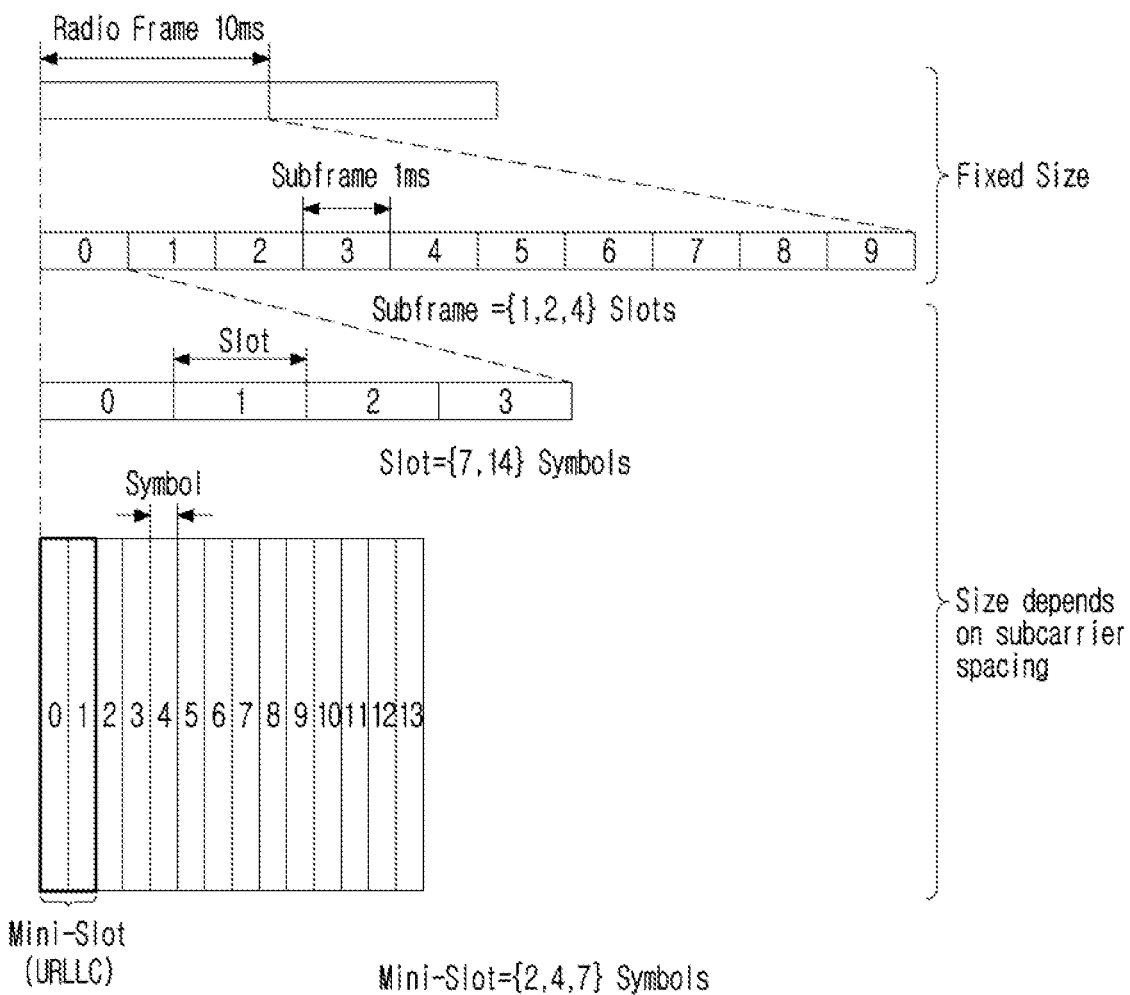

[FIG. 3]
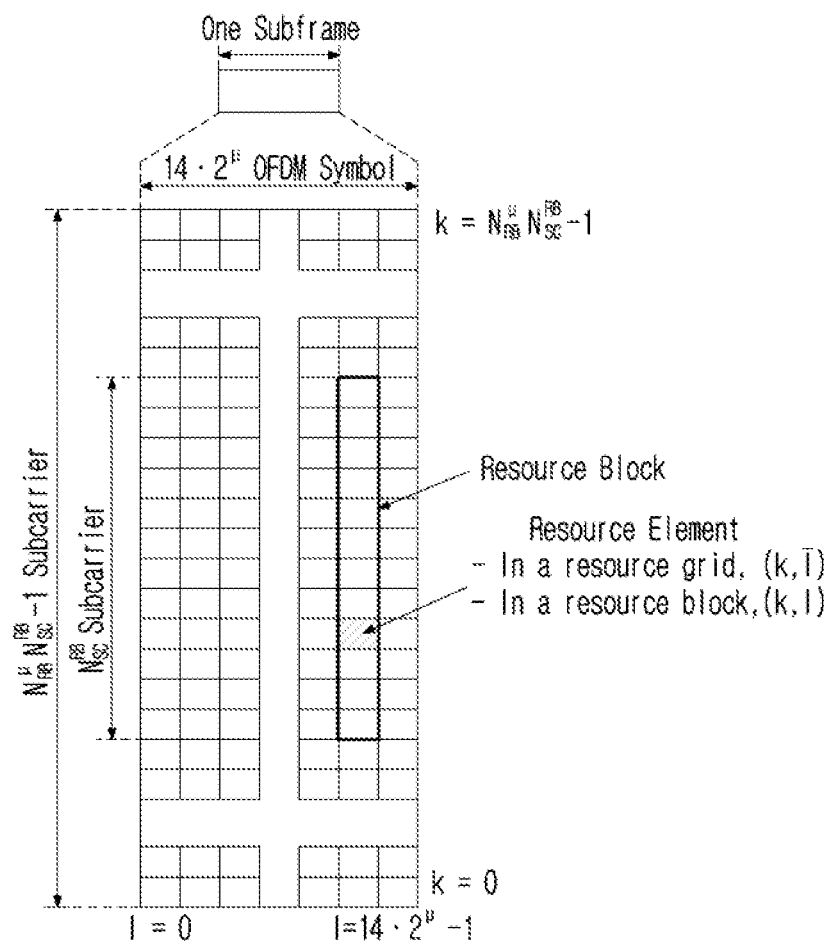

[FIG. 4]
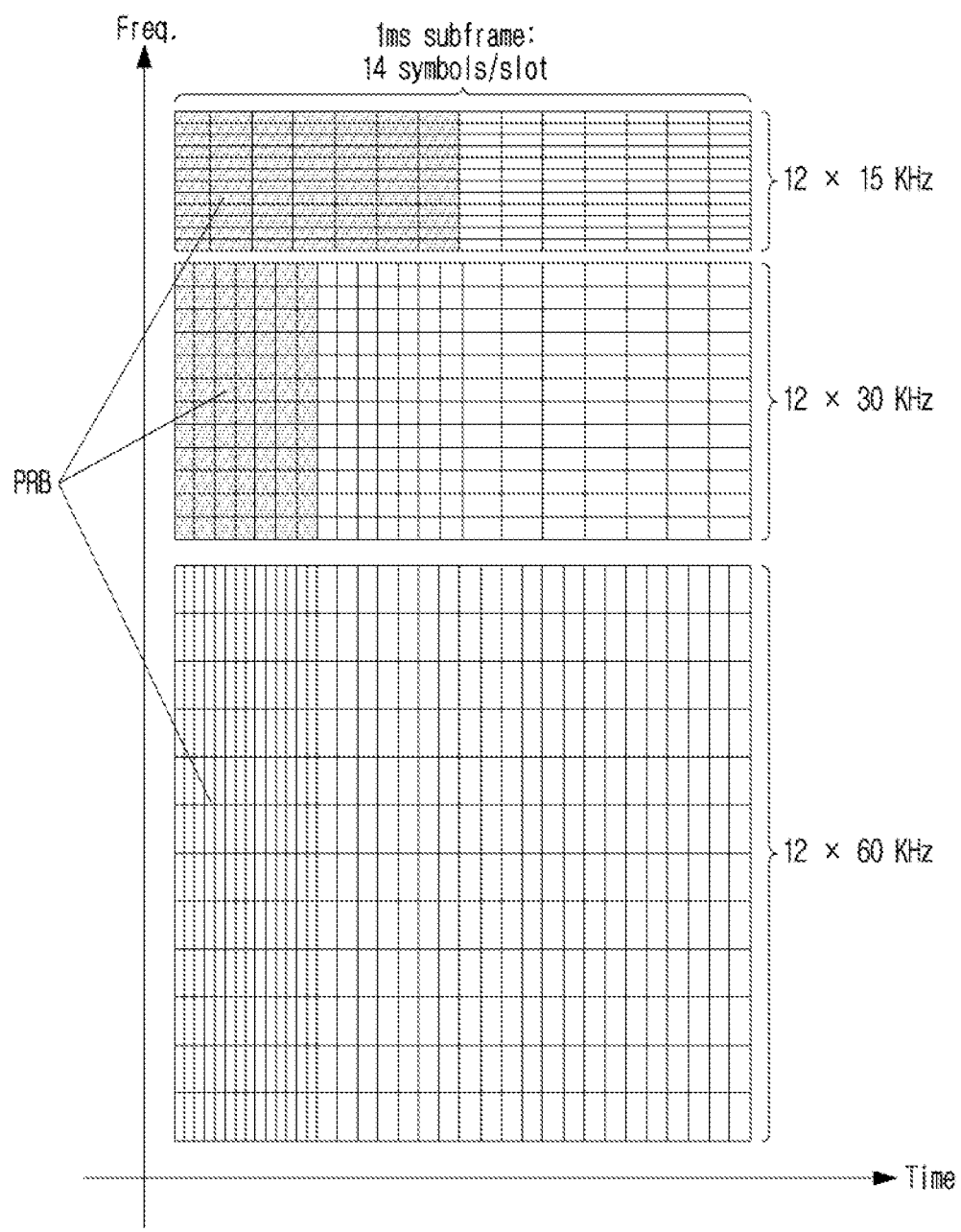

[FIG. 5]
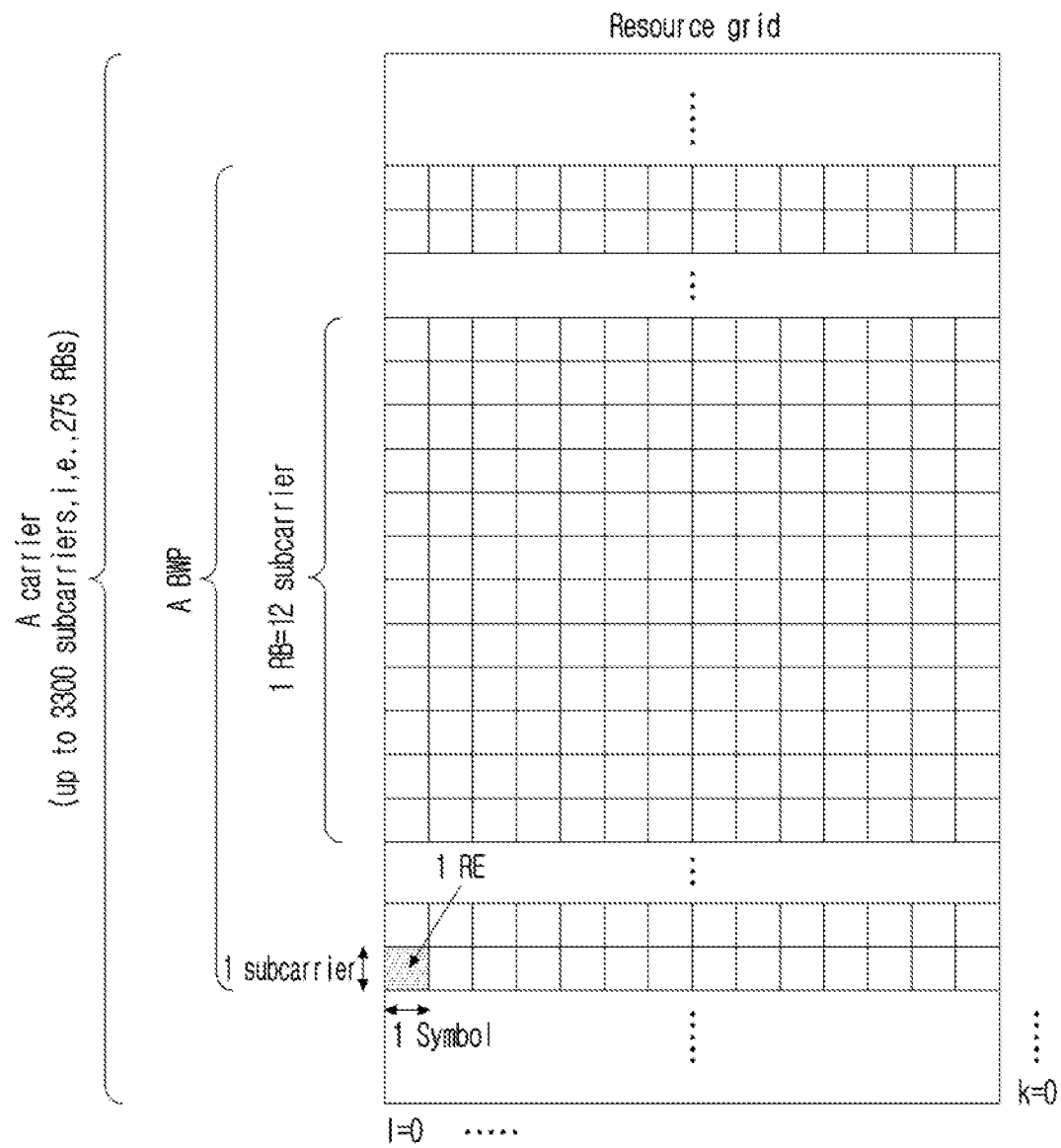

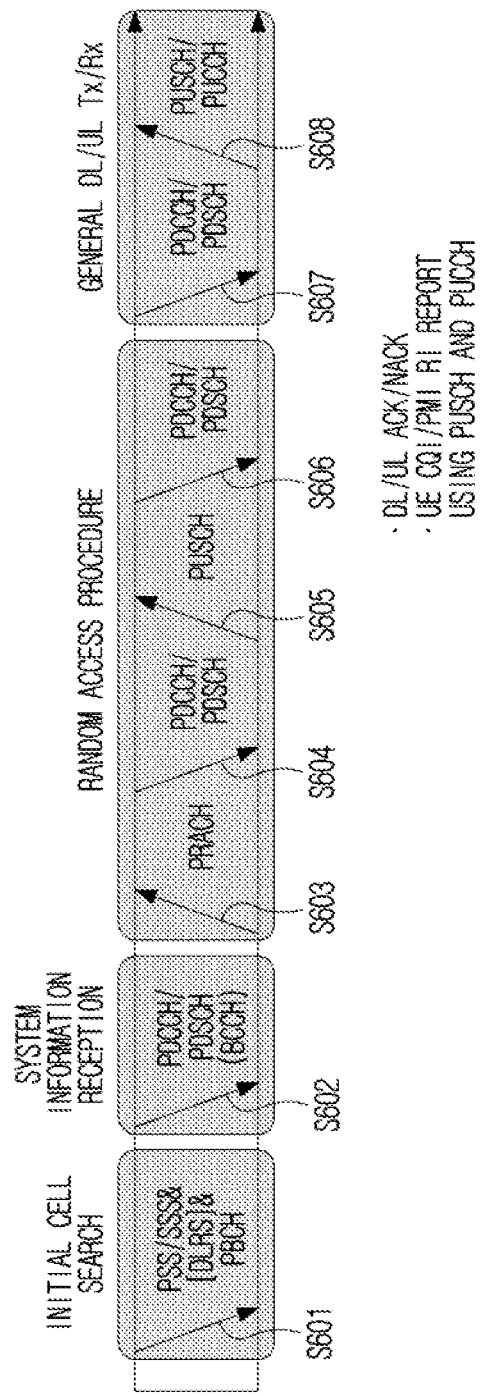
[FIG. 6]

【FIG. 7】
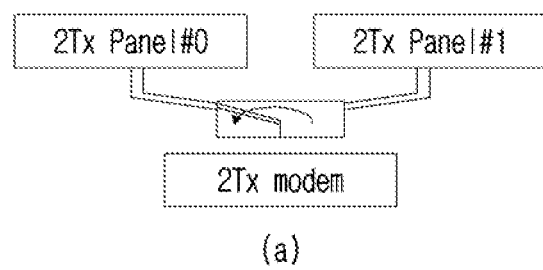
(a)
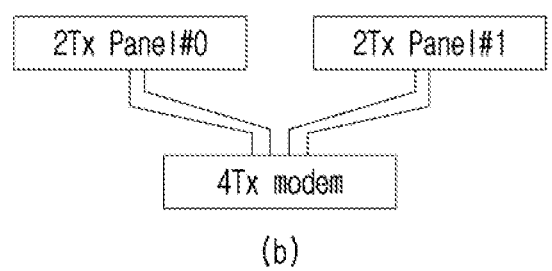
(b)

[FIG. 8]
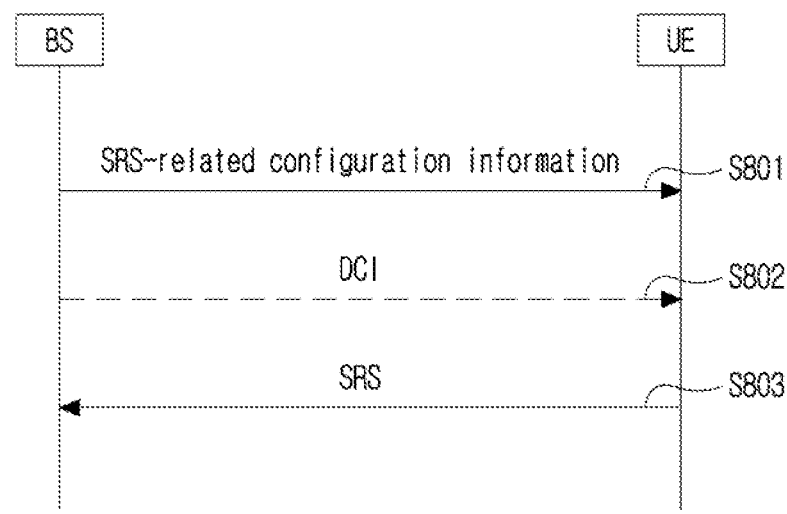

[FIG. 9]
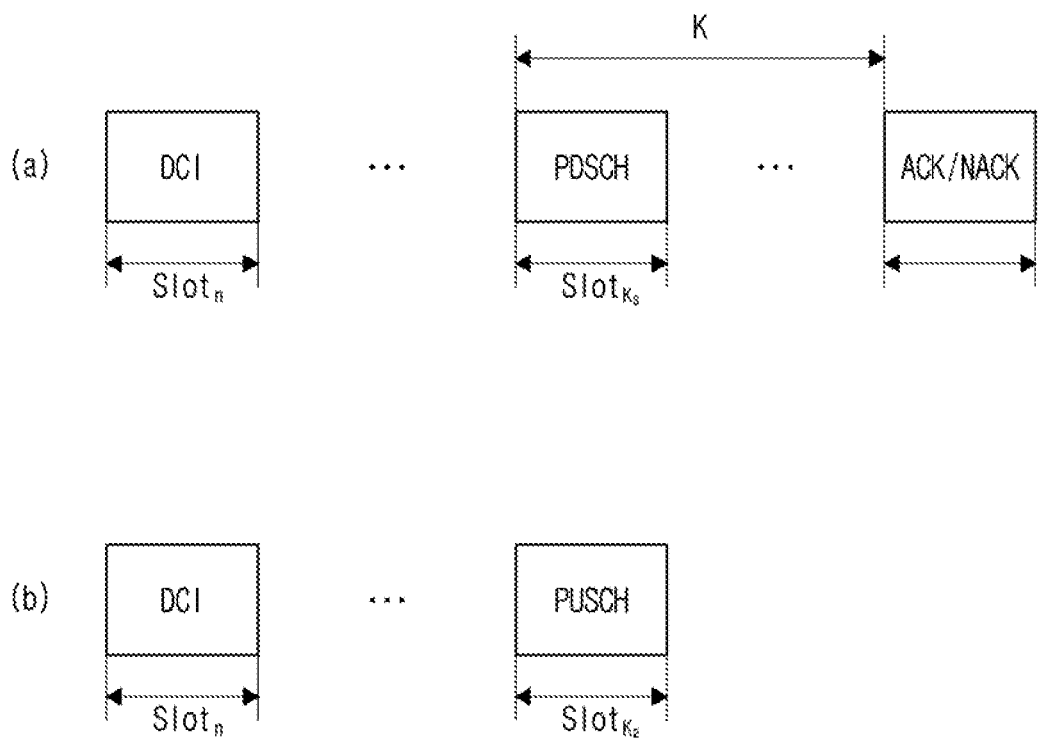

[FIG. 10]
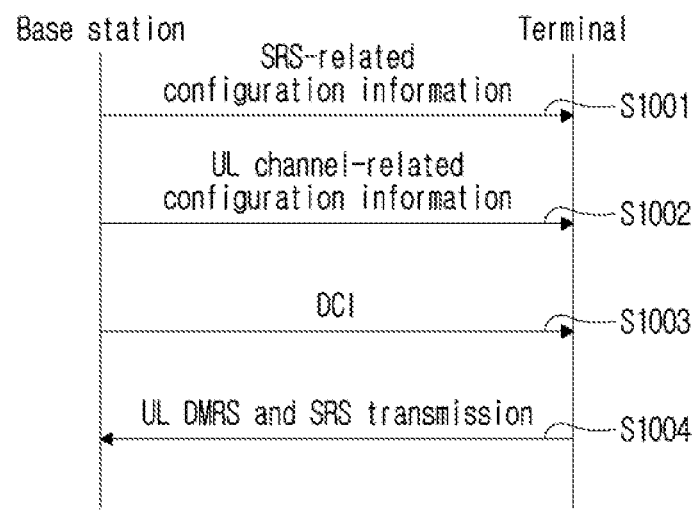

[FIG. 11]
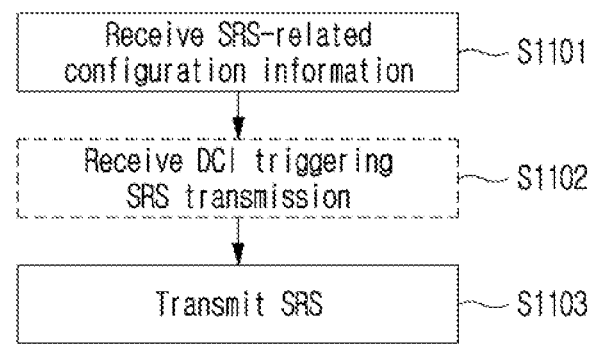

[FIG. 12]
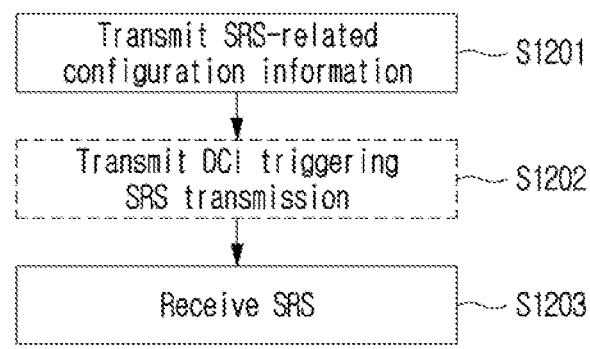

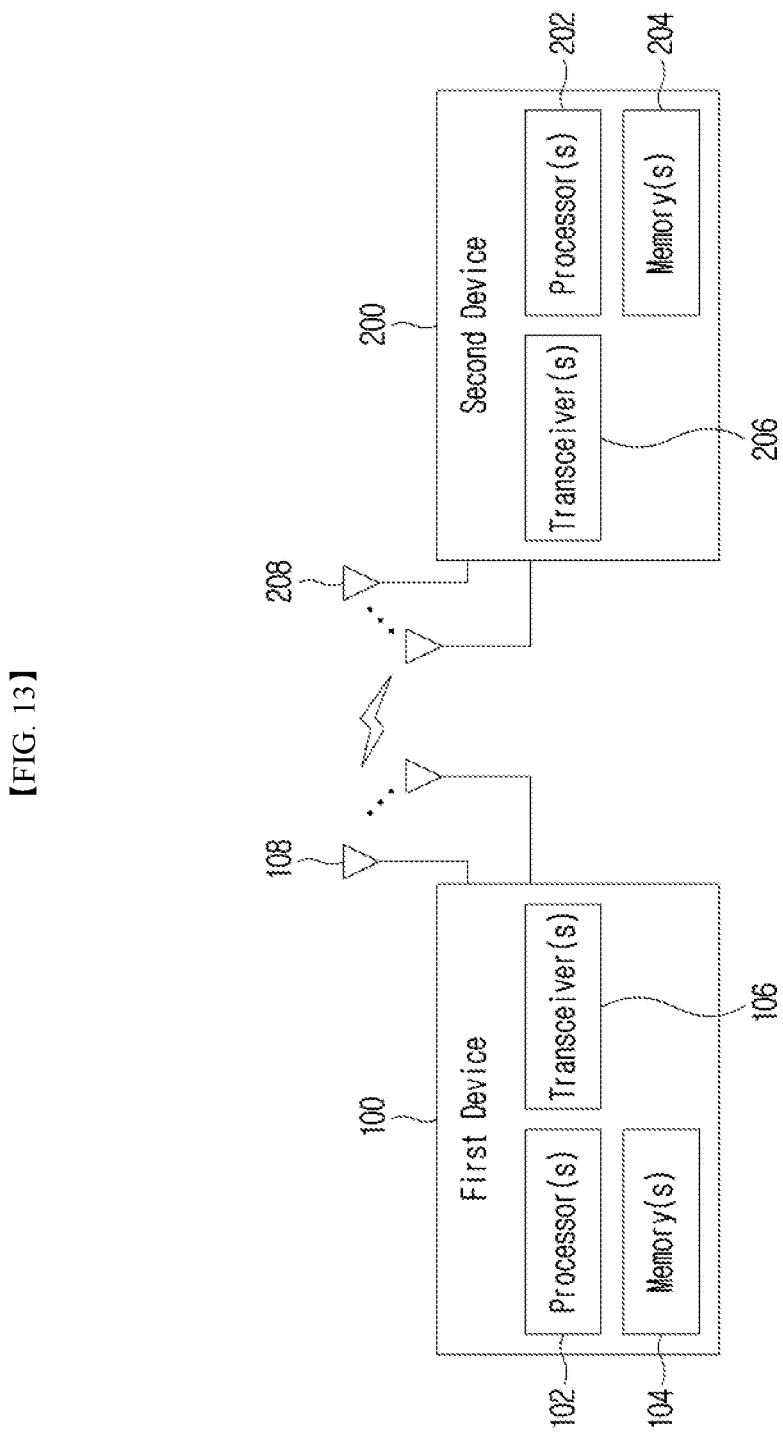
[FIG. 13]

METHOD AND APPARATUS FOR TRANSMITTING AND RECEIVING UPLINK SIGNAL IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 10-2020-0059918, filed on May 19, 2020, the contents of which are all hereby incorporated by reference herein in their entirety.

TECHNICAL FIELD

The present disclosure relates to a wireless communication system, and in more detail, relates to a method and an apparatus of transmitting and receiving an uplink signal in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus of transmitting and receiving an uplink signal.

In addition, an additional technical object of the present disclosure is to provide a method and an apparatus of allocating/configuring resources for transmitting a sounding reference signal at a symbol level.

In addition, an additional technical object of the present disclosure is to provide a method and an apparatus of triggering a plurality of sounding reference signal resource sets through one downlink control information.

In addition, an additional technical object of the present disclosure is to provide a method and an apparatus for time domain bundling between a sounding reference signal and an uplink demodulation reference signal.

The technical objects to be achieved by the present disclosure are not limited to the above-described technical objects, and other technical objects which are not described herein will be clearly understood by those skilled in the pertinent art from the following description.

Technical Solution

A method of transmitting an uplink signal in a wireless communication system: may include receiving configuration information related to a sounding reference signal (SRS) from a base station; and transmitting the SRS to the base station in one or more SRS resources in an SRS resource set configured by the configuration information. Based on time domain bundling between the SRS and an uplink demodulation reference signal (DMRS) being indicated, the SRS and the uplink DMRS may be transmitted on the same antenna port and/or with the same spatial domain transmission filter.

A method of receiving an uplink signal in a wireless communication system according to an additional aspect of the present disclosure: may include transmitting configuration information related to a sounding reference signal (SRS) to a terminal; and receiving the SRS in one or more SRS resources in an SRS resource set configured by the configuration information from the terminal. Based on time domain bundling between the SRS and an uplink demodulation reference signal (DMRS) being indicated, the SRS and the uplink DMRS may be transmitted on the same antenna port and/or with the same spatial domain transmission filter.

Advantageous Effects

According to an embodiment of the present disclosure, a signaling overhead may be reduced by triggering a plurality of sounding reference signal resource sets by one downlink control information.

According to an embodiment of the present disclosure, a signaling overhead may be reduced by triggering a sounding reference signal for an aperiodic sounding reference signal resource set to transmit it repeatedly.

In addition, according to an embodiment of the present disclosure, flexibility may be provided for transmission of a sounding reference signal and a collision with other uplink channels may be prevented by indicating the number of symbols and a transmission symbol starting position of a sounding reference signal as any symbol in a slot.

In addition, according to an embodiment of the present disclosure, accuracy of uplink channel estimation may be improved as time domain bundling with an uplink demodulation reference signal is applied.

In addition, according to an embodiment of the present disclosure, as time domain bundling with an uplink demodulation reference signal is applied, uplink resources may be effectively used because performance of uplink channel estimation may be maintained although fewer resources are allocated for a sounding reference signal.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 1 illustrates a structure of a wireless communication system to which the present disclosure may be applied.

FIG. 2 illustrates a frame structure in a wireless communication system to which the present disclosure may be applied.

FIG. 3 illustrates a resource grid in a wireless communication system to which the present disclosure may be applied.

FIG. 4 illustrates a physical resource block in a wireless communication system to which the present disclosure may be applied.

FIG. 5 illustrates a slot structure in a wireless communication system to which the present disclosure may be applied.

FIG. 6 illustrates physical channels used in a wireless communication system to which the present disclosure may be applied and a general signal transmission and reception method using them.

FIG. 7 is a diagram illustrating multi panel terminals in a wireless communication system to which the present disclosure may be applied.

FIG. 8 is a diagram illustrating a signaling procedure between a base station and a terminal for a method of transmitting and receiving a sounding reference signal according to an embodiment of the present disclosure.

FIG. 9 is a diagram illustrating downlink/uplink transmission timing in a wireless communication system to which the present disclosure may be applied.

FIG. 10 is a diagram illustrating a signaling procedure between a base station and a terminal for a method of transmitting and receiving an uplink signal according to an embodiment of the present disclosure.

FIG. 11 is a diagram illustrating an operation of a terminal for transmitting and receiving an uplink signal according to an embodiment of the present disclosure.

FIG. 12 is a diagram illustrating an operation of a base station for transmitting and receiving an uplink signal according to an embodiment of the present disclosure.

FIG. 13 illustrates a block diagram of a wireless communication system according to an embodiment of the present disclosure.

BEST MODE

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480.103 Hz and $N_f$ is 4096. Downlink and uplink transmission is configured (organized) with a radio frame having a duration of $Tf=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_{s,f}^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symbs}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$.

When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

FIG. 4 illustrates a physical resource block in a wireless communication system to which the present disclosure may be applied. And, FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a sub-carrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MC S-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Multi Panel Operations

'A Panel' referred to in the present disclosure may be interpreted/applied as 'a plurality of (or at least one) panels' or 'a panel group' (having similarity/a common value with regard to a specific characteristic (e.g., timing advance (TA), a power control parameter, etc.)). Alternatively, 'a panel' referred to in the present disclosure may be interpreted/applied as 'a plurality of (or at least one) antenna ports' or 'a plurality of (or at least one) uplink resources' or 'an antenna port group' or 'an uplink resource group (or set))' (having similarity/a common value with regard to a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having similarity/a common value with regard to a specific characteristic (e.g., TA, a power control parameter, etc.)). Alternatively, 'a panel' referred to in the present disclosure may be defined as a unit for a terminal to configure a transmission/reception beam. For example, 'a transmission panel' may be defined as a unit which may generate a plurality of candidate transmission beams in one panel, but may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set))' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be different according to terminal implementation. In addition, 'a panel' referred to in the present disclosure may be interpreted/applied as 'a plurality of panels' or 'a panel group' (having similarity with regard to a specific characteristic).

Hereinafter, multi panel structures will be described.

For terminal implementation in a high-frequency band, modeling terminal equipped with a plurality of panels (e.g., configured with one or a plurality of antennas) is considered (e.g., 2 bi-directional panels in 3GPP UE antenna modeling). A variety of forms may be considered for such implementation of a plurality of panels of a terminal. The after-described contents are based on a terminal which supports a plurality of panels, but they may be extended and applied to a base station which supports a plurality of panels (e.g., TRP). The after-described contents related to multi panel structures may be applied to transmission and reception of a signal and/or a channel considering multi panels described in the present disclosure.

FIG. 7 is a diagram illustrating multi panel terminals in a wireless communication system to which the present disclosure may be applied.

FIG. 7(a) illustrates implementation of RF (radio frequency) switch-based multi panel terminals and FIG. 7(b) illustrates implementation of RF connection-based multi panel terminals.

For example, it may be implemented based on RF switch as in FIG. 7(a). In this case, only one panel is activated for a moment, and it may be impossible to transmit a signal for a certain duration of time to change an activated panel (i.e., panel switching).

For implementation of a plurality of panels in a different way, a RF chain may be connected respectively so that each panel can be activated anytime as in FIG. 7(b). In this case, time for panel switching may be 0 or too little. And, it may be possible to simultaneously transmit a signal by activating a plurality of panels at the same time (STxMP: simultaneous transmission across multi-panel) according to a modem and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as a SRS resource group. For this SRS resource group, a SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 7(b) are considered, a corresponding concept (a SRS resource set) itself may be matched to a SRS resource group. But, a SRS resource group may be separately defined if even implementation (panel switching) as in FIG. 7(a) is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to UE. Hereinafter, for convenience, each is referred to as SRS resource set A, B, C, D. In addition, a situation is considered which applies implementation performing SRS transmission by corresponding each of the sets to one (Tx) panel because UE implements a total of 4 (Tx) Panels.

TABLE 6

| The maximum number of SRS resource sets across all time domain behaviors (periodic/semi-persistent/aperiodic) reported in 2-30 | Additional limit to the maximum number of the maximum SRS resource sets per supported time domain behavior(periodic/semi-persistent/aperiodic) |
| --- | --- |
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for UE which performs capability reporting for a value reported in feature group (FG) 2-30 as 7 or 8 in Table 6, a total of up to 4 SRS resource sets for BM (per supported time domain behavior) may be configured as in the right column of Table 6. As above, implementation which performs transmission by corresponding one UE panel to each set may be applied.

In this case, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which can be transmitted per each panel. In other words, the UE may respectively correspond 2 UL beams to 2 configured SRS resources per each panel and transmit them, when 4 panels are implemented. In this situation, according to Rel-15 standards, one of a codebook(CB)-based UL or non-codebook(NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

MPUE category 1: In a terminal that multiple panels are implemented, only one panel may be activated at a time. A delay for panel switching/activation may be configured as [X]ms. In an example, the delay may be configured to be longer than a delay for beam switching/activation and may be configured in a unit of a symbol or in a unit of a slot. MPUE category 1 may correspond to MPUE-assumption) described in standardization-related documents (e.g., a 3gpp agreement, a technical report (TR) document and/or a technical specification (TS) document, etc.).

MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3gpp agreement, a TR document and/or a TS document, etc.).

MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, a SRS, and/or a PRACH among activated multiple panels. The ID may be configured/defined based on at least any one of the following 4 methods (options (Alts) 1, 2, 3, 4).

Alt.1: An ID for a panel may be a SRS resource set ID.

In an example, it may be desirable to correspond each UE Tx panel to a SRS resource set configured with regard to terminal implementation when considering a) an aspect that SRS resources of multiple SRS resource sets having the same time domain behavior are simultaneously transmitted in the same BWP, b) an aspect that a power control parameter is configured in a unit of a SRS resource set, c) an aspect that a terminal may report as up to 4 SRS resource sets (they may correspond to up to 4 panels) according to a supported time domain behavior. In addition, an Alt.1 scheme has an advantage that a SRS resource set related to each panel may be used for 'codebook' and 'non-codebook'-based PUSCH transmission. In addition, for an Alt.1 scheme, multiple SRS resources belonging to multiple SRS resource sets may be selected by extending a SRI (SRS resource indicator) field of DCI. In addition, a mapping table of an SRI to an SRS resource may need to be extended to include SRS resources in the whole SRS resource set.

ii) Alt.2: An ID for a panel may be an ID which is (directly) associated with a reference RS resource and/or a reference RS resource set.

iii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC SpatialRelationInfo).

An Alt.4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., a SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer 1 (L1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to panel may be configured in a unit of a single panel or in a unit of multiple panels (e.g., a panel group, a panel set).

Sounding Reference Signal (SRS)

In Rel-15 NR, spatialRelationInfo may be used in order for a base station to indicate to a terminal a transmission beam which will be used when transmitting an UL channel. A base station may indicate which UL transmission beam will be used when transmitting a PUCCH and an SRS by configuring a DL reference signal (e.g., an SSB-RI (SB Resource Indicator), a CRI(CSI-RS Resource Indicator)(P/SP/AP: periodic/semi-persistent/aperiodic)) or an SRS (i.e., an SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through an SRI field and used as a PUSCH transmission beam of a terminal.

Hereinafter, a SRS for a codebook (CB) and a non-codebook (NCB) will be described.

First, for a CB UL, a base station may first configure and/or indicate transmission of an SRS resource set for 'a CB' to a terminal. In addition, a terminal may transmit any n port SRS resource in a corresponding SRS resource set. A base station may receive a UL channel based on corresponding SRS transmission and use it for PUSCH scheduling of a terminal. Subsequently, a base station may indicate a PUSCH (transmission) beam of a terminal by indicating a SRS resource for 'a CB' which is previously transmitted by a terminal through a SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

Next, for a NCB UL, a base station may first configure and/or indicate transmission of an SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS associated with a corresponding SRS resource set. Subsequently, a base station may indicate a PUSCH (transmission) beam of a terminal and an UL rank and an UL precoder at the same time by indicating part of SRS resources for 'a non-CB' which are previously transmitted by a terminal through an SRI field of DCI when performing PUSCH scheduling through UL DCI. Thereby, a terminal may perform PUSCH transmission according to a corresponding indication.

Hereinafter, an SRS for beam management will be described.

An SRS may be used for beam management. Specifically, UL BM may be performed by beamformed UL SRS transmission. Whether UL BM of an SRS resource set is applied is configured by (a higher layer parameter) 'usage'. When usage is configured as 'BeamManagement(BM)', only one SRS resource may be transmitted to each of a plurality of SRS resource sets in a given time instant. A terminal may be configured with one or more Sounding Reference Symbol (SRS) resource sets configured by (a higher layer parameter) SRS-ResourceSef (through higher layer signaling, e.g., RRC signaling, etc.). For each SRS resource set, UE may be configured with K≥1 SRS resources (a higher layer parameter, 'SRS-resource'). Here, K is a natural number and the maximum value of K is indicated by SRS_capability.

Hereinafter, an SRS for antenna switching will be described.

An SRS may be used for acquisition of DL CSI (Channel State Information) information (e.g., DL CSI acquisition). In a specific example, a BS (Base station) may measure an SRS from UE after scheduling transmission of an SRS to UE (User Equipment) under a situation of a single cell or in multi cells (e.g., carrier aggregation (CA)) based on TDD. In this case, a base station may perform scheduling of a DL signal/channel to UE based on measurement by an SRS by assuming DL/UL reciprocity. Here, regarding SRS-based DL CSI acquisition, an SRS may be configured for antenna switching.

In an example, when following standards (e.g., 3gpp TS38.214), usage of an SRS may be configured to a base station and/or a terminal by using a higher layer parameter (e.g., usage of a RRC parameter, SRS-ResourceSet). Here, usage of a SRS may be configured as usage of beam management, usage of codebook transmission, usage of non-codebook transmission, usage of antenna switching, etc.

Hereinafter, a case in which SRS transmission (i.e., transmission of an SRS resource or an SRS resource set) is configured for antenna switching among the usages will be specifically described.

In an example, for a terminal with partial reciprocity, SRS transmission based on antenna switching (i.e., transmission antenna switching) may be supported for DL(downlink) CSI(Channel State Information) acquisition through SRS transmission under a situation such as TDD (Time Division Duplex). When antenna switching is applied, about 15/LS may be generally needed between SRS resources (and/or resources between a SRS resource and a PUSCH/a PUCCH) for antenna switching of a terminal. By considering it, (the minimum) guard period as in the following Table 7 may be defined.

TABLE 7

| μ | $\Delta f = 2^\mu \cdot 15$ [kHz] | Y [Symbol] |
| --- | --- | --- |
| 0 | 15 | 1 |
| 1 | 30 | 1 |
| 2 | 60 | 1 |
| 3 | 120 | 2 |

In Table 7, μ represents numerology, Δf represents sub-carrier spacing and Y represents the number of symbols of a guard period, i.e., a length of a guard period. In reference to Table 7, the guard period may be configured based on a parameter μ which determines numerology. In the guard period, a terminal may be configured not to transmit any other signal and the guard period may be configured to be used fully for antenna switching. In an example, the guard period may be configured by considering SRS resources transmitted in the same slot. In particular, when a terminal is configured and/or indicated to transmit an aperiodic SRS configured by intra-slot antenna switching, a corresponding terminal may transmit an SRS on each designated SRS resource by using a different transmission antenna and the above-described guard period may be configured between each resource.

In addition, as described above, when a terminal is configured with an SRS resource and/or an SRS resource set configured for antenna switching through higher layer signaling, a corresponding terminal may be configured to perform SRS transmission based on UE capability related to antenna switching. In this case, UE capability related to antenna switching may be '1T2R', '2T4R', '1T4R', '1T4R/2T4R', '1T1R', '2T2R', '4T4R', etc. Here, 'mTnR' may mean UE capability which supports m transmission and n reception.

(Example S1) For example, for a terminal which supports 1T2R, up to 2 SRS resource sets may be configured as a different value for resourceType of a higher layer parameter SRS-ResourceSet. In this case, each SRS resource set may have 2 SRS resources transmitted in different symbols and each SRS resource may configure a single SRS port in a given SRS resource set. In addition, an SRS port for a second SRS resource in an SRS resource set may be configured to be associated with a UE antenna port different from an SRS port for a first SRS resource in the same SRS resource set.

(Example S2) In another example, for a terminal which supports 2T4R, up to 2 SRS resource sets may be configured as a different value for resourceType of a higher layer parameter SRS-ResourceSet. Here, each SRS resource set may have 2 SRS resources transmitted in different symbols and each SRS resource may configure 2 SRS ports in a given SRS resource set. In addition, an SRS port pair for a second SRS resource in an SRS resource set may be configured to be associated with a UE antenna port different from an SRS port pair for a first SRS resource in the same SRS resource set.

(Example S3) In another example, for a terminal which supports 1T4R, SRS resource sets may be configured by a different scheme according to whether SRS transmission is configured as periodic, semi-persistent and/or aperiodic. First, when SRS transmission is configured as periodic or semi-persistent, 0 SRS resource set configured or 1 SRS resource set configured with 4 SRS resources based on resourceType of a higher layer parameter SRS-ResourceSet may be configured to be transmitted in different symbols. Here, each SRS resource may configure a single SRS port in a given SRS resource set. In addition, an SRS port for each SRS resource may be configured to be associated with a different UE antenna port. On the other hand, when SRS transmission is configured as aperiodic, 0 SRS resource set configured or 2 SRS resource sets configured with a total of 4 SRS resources based on resourceType of a higher layer parameter SRS-ResourceSet may be configured to be transmitted in different symbols of 2 different slots. Here, a SRS port for each SRS resource in 2 given SRS resource sets may be configured to be associated with a different UE antenna port.

(Example S4) In another example, for a terminal which supports 1T1R, 2T2R, or 4T4R, up to 2 SRS resource sets respectively configured with one SRS resource may be configured for SRS transmission. The number of SRS ports of each SRS resource may be configured to be 1, 2, or 4.

When indicated UE capability is 1T4R/2T4R, a corresponding terminal may expect that the same number of SRS ports (e.g., 1 or 2) will be configured for all SRS resources in SRS resource set(s). In addition, when indicated UE capability is 1T2R, 2T4R, 1T4R, or 1T4R/2T4R, a corresponding terminal may not expect that one or more SRS resource sets configured for antenna switching in the same slot will be configured or triggered. In addition, when indicated UE capability is 1T1R, 2T2R, or 4T4R, a corresponding terminal may not expect that one or more SRS resource sets configured for antenna switching in the same slot will be configured or triggered.

A Method for Transmission and Reception of an Uplink Signal

In NR MIMO Rel-17, an additional (or enhanced) SRS supporting more symbols may be defined for the existing NR legacy SRS (i.e., up to 4 symbols in one SRS resource may be configured in last 6 symbols in one slot.).

In reference to a Rel-17 NR MIMO(FeMIMO) discussion for SRS enhancement, SRS enhancement targeted for both FR1 and FR2:

identifies and specifies enhancement in aperiodic SRS triggering to enable more flexible triggering and/or a decrease in a DCI overhead/usage.

specifies SRS switching up to 8 antennas (e.g., xTyR, x={1, 2, 4} and y={6, 8}).

evaluates the following mechanism(s) and if necessary, specifies them to enhance an SRS capacity and/or coverage: SRS time bundling, increased SRS repetitions, partial sounding across a frequency.

As such, it is expected that multi-symbol SRSs will be supported in a time domain space/resource (i.e., in a time domain region exceeding 4 symbols) except for last 6 symbols in one slot to enhance a capacity and coverage of a NR SRS. In this case, for a (Rel-17) additional (or enhanced) SRS, for a specific UL slot, a case may occur in which transmission timing of an SRS collides with transmission timing of a UL channel (e.g., a PUCCH, a PUSCH, a PRACH (physical random access channel), etc.) at a symbol level, and in this case, ambiguity may be generated in a terminal operation.

Based on this background, the present disclosure proposes a method for base station to configure an additional (or enhanced) SRS that supporting more symbols as well as a NR Legacy SRS to a terminal and a method of indicating transmission of an SRS, and proposes a method of transmitting subsequently an SRS of a terminal.

Specifically, a configuration method of a base station for an additional (enhanced) SRS after Rel-17 is proposed. In addition, in a corresponding configuration, for collision prevention between multi UEs (for capacity enhancement) or for dynamic symbol level resource allocation, a method of effectively supporting multi-symbol SRSs configured in 4 symbols or more through MAC control element (CE)/DCI update of a symbol level starting point value in a slot (or a configuration/an indication/update of a symbol level offset) is proposed. In addition, a method that 2 or more different aperiodic SRS (AP-SRS) resource sets are triggered by one DCI or/and a method that 1 AP-SRS resource set is triggered by multi-shots (i.e., multiple transmission) through one DCI and a method of transmitting subsequently an SRS of a terminal are proposed.

Hereinafter, in the present disclosure, "transmission of an SRS resource set" may be used in the same meaning as "transmission of an SRS based on information configured in an SRS resource set". In addition, "transmitting an SRS resource" or "transmitting SRS resources" may be used in the same meaning as "transmitting an SRS or SRSs based on information configured in an SRS resource". In addition, an SRS enhanced (or defined) after Rel-17 may be referred to as an additional SRS or an enhanced SRS. A terminal supporting a corresponding additional (enhanced) SRS may be referred to as additional UE or an enhanced terminal. Regarding it, a legacy SRS refers to an SRS that up to 4 symbols may be configured (legacy SRS configuration). In addition, an enhanced SRS (an additional SRS) refers to an SRS that 4 symbols or more may be configured (enhanced SRS (additional SRS) configuration). It is just for convenience of description, not for limiting a technical scope. For example, an SRS that up to 4 symbols may be configured may be referred to as a first SRS and an SRS that 4 symbols or more may be configured may be referred to as a second SRS. Accordingly, a legacy SRS configuration may be referred to as a first SRS configuration and an enhanced SRS (additional SRS) configuration may be referred to as a second SRS configuration.

Proposal 1: A method of configuring an SRS resource (set) of a base station for capacity and/or coverage enhancement A base station may transmit a configuration for configuring an additional SRS for enhanced UE (after Rel-17) (e.g., a configuration for an SRS resource set, a configuration for an SRS resource) to enhanced UE separately from a configuration for a legacy SRS configuration. For example, an IE for configuring an additional SRS (e.g., SRS-ResourceSet-r17, SRS-Resource-r17) may be separately configured except for an IE for a legacy SRS configuration (e.g., SRS-ResourceSet, SRS-Resource, etc.) (before Rel-17) in a RRC configuration information element (IE), 'SRS-config'. An additional SRS configuration for such enhanced UE may be considered as a configuration including or/and exceeding a function of a legacy SRS configuration considering that 4 symbols or more may be configured in configuring time domain allocation in a slot for each SRS resource.

Therefore, enhanced UE does not expect to receive a legacy SRS configuration and an additional SRS configuration at the same time in 'SRS-config', an IE configured for a specific BWP in a specific cell. In other words, UE does not expect that both a legacy SRS configuration and an additional SRS configuration are configured. In other words, enhanced UE may receive a legacy SRS configuration or an additional SRS configuration (i.e., one of the two) for a specific BWP in a specific cell.

Proposal 2: A method for flexible/dynamic symbol level resource allocation of a SRS resource in an additional SRS configuration An additional SRS may be configured in more symbols compared with a legacy SRS. In other words, for a legacy SRS, up to 4 symbols may be configured in one SRS resource in last 6 symbols in one slot. However, an additional SRS may be configured in a time domain space/resource except for last 6 symbols in one slot. Accordingly, in a specific UL slot, when SRS transmission timing is overlapped (or collides) with transmission timing of other UL channel (e.g., a PUCCH, a PUSCH, a PRACH, another SRS, etc.), a probability of a collision at a symbol level increases. In other words, a collision may be occurred in at least one symbol. In addition, there may be a possibility that an SRS of specific UE collides with an SRS (or other UL channel) of other UE.

Proposal 2 proposes a method in which an SRS resource is allocated at a symbol level in a slot to prevent such a collision and effectively support a SRS multiplexing capacity of multi UE.

In the existing legacy SRS configuration, a RRC (radio resource control) configuration of a SRS resource in an IE, 'SRS-config', is as in the following Table 8.

TABLE 8

```
SRS-Resource ::=                    SEQUENCE{
    srs-ResourceId                      SRS-ResourceId,
    nrofSRS-Ports                       ENUMERATED {port1, ports2, ports4},
    ptrs-PortIndex                      ENUMERATED {n0, n1 }
OPTIONAL,   -- Need R
    transmissionComb                    CHOICE {
        n2                                  SEQUENCE{
            combOffset-n2                       INTEGER (0..1),
            cyclicShift-n2                      INTEGER (0..7)
        },
        n4                                  SEQUENCE{
            combOffset-n4                       INTEGER (0..3),
            cyclicShift-n4                      INTEGER (0..11)
        }
    },
    resourceMapping                     SEQUENCE{
        startPosition                       INTEGER (0..5),
        nrofSymbols                         ENUMERATED {n1, n2, n4},
        repetitionFactor                    ENUMERATED {n1, n2, n4}
    },
    freqDomainPosition                  INTEGER (0..67),
    freqDomainShift                     INTEGER (0..268),
    freqHopping                         SEQUENCE{
        c-SRS                               INTEGER (0..63),
        b-SRS                               INTEGER (0..3),
        b-hop                               INTEGER (0..3)
    },
    groupOrSequenceHopping              ENUMERATED { neither,
groupHopping, sequenceHopping },
    resourceType                        CHOICE {
        aperiodic                           SEQUENCE{
            ...
        },
        semi-persistent                     SEQUENCE{
            periodicityAndOffset-sp             SRS-PeriodicityAndOffset,
            ...
        },
        periodic                            SEQUENCE{
```

TABLE 8-continued

```
       periodicityAndOffset-p              SRS-PeriodicityAndOffset,
       ...
      }
   },
   sequenceId                    INTEGER (0..1023),
   spatialRelationInfo           SRS-SpatialRelationInfo
OPTIONAL,   -- Need R
   ...
}
```

In reference to Table 8, a symbol level starting point value of a corresponding SRS resource may be configured through a parameter, 'startPosition' in a 'resourceMapping' field, in a legacy SRS resource configuration. This value may have a value of '0 to 5' based on last 6 symbols in a slot.

For an additional SRS, an SRS resource configuration may be configured in all symbols in a slot and accordingly, may be configured up to 14 symbols. Accordingly, a 'startPosition' parameter of an (additional) SRS resource may have a value of '0 to 13' for all of 14 symbols in a slot. For an (additional) SRS resource configuration, a parameter, 'nrofSymbols' which means the number of symbols spanning in a slot, may be also extended up to 14 symbols. In other words, an (additional) SRS resource may be guaranteed full flexibility with regard to time domain resource allocation in a slot. However, it increases a probability that an SRS will collide with another UL channel (e.g., a PUCCH, a PUSCH, a PRACH, another SRS, etc.), which may cause ambiguity in a UE operation.

Proposal 2-1: A MAC CE update method of a symbol level starting position value in a slot of an SRS resource configuration In a RRC configuration of Enhanced UE, a 'startPosition' parameter (and/or 'nrofSymbols') of a separate (additional) SRS resource belonging to a specific BWP of a specific cell may be updated through a MAC CE message (and/or DCI) of a base station. For example, as an offset value is indicated based on a pre-configured RRC 'startPosition' parameter, an SRS starting position in a slot may be updated and as a new starting position value is indicated, an SRS starting position in a slot may be updated.

A terminal may apply a corresponding updated 'startPosition' parameter from a slot after the certain number of slots (e.g., 3 slots) from slot n which transmits an ACK/NACK PUCCH for corresponding MAC CE signaling.

For example, it is assumed that UE received MAC CE signaling (e.g., a command for updating a starting position) for updating 'startPosition' for one SRS resource and UE transmitted HARQ-ACK information for a PDSCH carrying the MAC CE signaling through a PUCCH in slot n. In this case, an assumption and a corresponding operation of UE for SRS transmission corresponding to a configured SRS resource may be applied from a first slot after n+3Nslotsubframe,µ, slots. In this case, µ is a SCS (subcarrier spacing) configuration for a PUCCH.

Through an operation in the proposal 2-1, a base station may quickly update a starting position of an SRS resource according to a specific situation. In addition, for an enhanced terminal, it has an effect that an SRS resource spanning fully flexibly in a slot may prevent a collision with another UL channel or another SRS (or a UL channel/a RS of another UE). In addition, it may be considered as a simple and the most conservative method which modifies an operation of Rel-15 NR to a minimum.

Proposal 2-2: A DCI indication method of a symbol level offset value for a symbol level starting position value in a slot of a SRS resource configuration In a RRC configuration of enhanced UE, a different startPosition parameter may be configured for each SRS resource in a specific SRS resource set. It is to prevent spanning symbols of each SRS resource from colliding with each other in one slot.

A base station may indicate a symbol level offset value when triggering a (aperiodic) SRS resource set through an SRS request field of DCI to enhanced UE. A symbol level offset may be used collectively for shifting a starting position (startPosition) of SRS resources in a corresponding SRS resource set in a slot.

For example, a symbol level offset value may be indicated through a specific field except for an SRS request field in a DCI payload. For example, a specific field in the DCI may have a size of up to 5 bits. For example, a value of up to {−13, −12, . . . , −1, [0], +1, . . . , +12, +13} may be indicated through a specific field in the DCI.

More specifically, when a base station triggers a specific (aperiodic) SRS resource set to enhanced UE through DCI, a symbol level offset value for startPosition may be indicated through a specific field in the DCI. In this case, when transmitting a subsequent corresponding (aperiodic) SRS resource set, a terminal may perform transmission by applying the symbol level offset value to startPosition of all SRS resources in a corresponding resource set.

For example, it is assumed that SRS resource 1 and SRS resource 2 were configured in a specific (aperiodic) SRS resource set of enhanced UE. In addition, it is assumed that a starting position (startPosition) of SRS resource 1 is 0 and the number of symbols (nrofSymbols) of SRS resource 1 is 2 and that a starting position (startPosition) of SRS resource 2 is 3 and the number of symbols (nrofSymbols) of SRS resource 2 is 2. It is assumed that a base station transmits DCI triggering a corresponding SRS resource set to a terminal and a symbol level offset value for a starting position (startPosition) is indicated as +5 through the specific field in corresponding DCI. In this case, as a terminal shifts startPosition of SRS resource 1 to 5 (i.e., 0+5=5), an SRS may be transmitted in 2 symbols by starting from symbol 5. In addition, as a terminal shifts startPosition of SRS resource 2 to 8 (i.e., 3+5=8), an SRS may be transmitted in 2 symbols by starting from symbol 8.

An operation for the above-described symbol level offset may be applied to an (aperiodic) SRS resource set triggered through DCI in a one-time/one-off way. In other words, although a symbol level offset is applied to a first (aperiodic) SRS resource set triggered by first DCI, and subsequently, although a corresponding first (aperiodic) SRS resource set is re-triggered by another second DCI, the symbol level offset may not be applied. In other words, a symbol level offset needs to be indicated again by second DCI. In addition, a symbol level offset may not be changed for an (aperiodic) SRS resource set which is not triggered by the DCI.

Alternatively, an operation indicating the symbol level offset by a configuration/an indication of a base station may configure/indicate semi-permanent update of a starting position (startPosition) of SRS resources in a corresponding SRS resource set (i.e., until RRC/MAC CE/DCI are additionally updated). In this case, when a terminal normally decodes the DCI, a terminal may apply an updated starting position (startPosition) when transmitting the (aperiodic) SRS resource set subsequently. In other words, regardless of whether transmission of a specific SRS resource set is triggered by DCI, a starting position for a specific SRS resource set may be updated. For example, it is assumed that a symbol level offset value for startPosition is indicated through the specific field in DCI and at the same time, that a codepoint of an SRS request field of corresponding DCI is '00' (i.e., no SRS transmission triggering). In this case, when there is an (aperiodic) SRS resource set which is associated/linked/configured by RRC description in a corresponding codepoint, a terminal may (update and) apply the symbol level offset value for the starting position (startPosition) to the corresponding SRS resource set. In other words, for the DCI, a codepoint of the SRS request field is '00', so a terminal does not transmit the SRS for the corresponding SRS resource set, but subsequently, when SRS transmission for the corresponding SRS resource set is triggered by another DCI, UE may apply the symbol level offset value.

Through an operation of the above-described suggestion 2-2, when a base station recognizes that an additional SRS collides with another UL channel or another SRS (or an UL channel/a RS of another UE) in the same UL slot (e.g., a symbol level collision), there is an advantage of facilitating flexible resource allocation by dynamically indicating a symbol level offset value for a starting position (startPosition) of SRS resources in an (aperiodic) SRS resource set when triggering an additional SRS.

Proposal 2-3: A Method of preventing a collision with another UL channel and another UE by indicating an available (or unavailable) symbol resource in a slot when triggering a SRS through DCI A base station may indicate an available (or unavailable) symbol resource in a slot through a DCI specific field when triggering an (aperiodic) SRS resource set through DCI to enhanced UE (e.g., through an SRS request field in DCI). For example, for a symbol resource which may be used (or may not be used) by DCI in a slot, i) a start symbol and a symbol duration may be indicated or ii) a full bitmap (i.e., a bitmap configured with 14 bits for one slot) may be indicated. In this case, a terminal may perform re-indexing for a symbol index with symbols that SRS resources can be located in the SRS resource set triggered by i) or ii) (or, when unavailable symbols are indicated, remaining symbols excluding symbols that SRS resources cannot be located (unavailable symbols)). In addition, a terminal may transmit an SRS by applying the number of symbols (nrofSymbols) and each starting position (startPosition) of SRS resources in a corresponding SRS resource set within corresponding re-indexed symbols. In other words, in available symbol resources in a slot indicated by the DCI, SRS resources in a triggered SRS resource set are transmitted.

For example, it is assumed that SRS resource 1 and SRS resource 2 were configured in a specific (aperiodic) SRS resource set of enhanced UE. In addition, it is assumed that a starting position (startPosition) of SRS resource 1 is 0 and the number of symbols (nrofSymbols) of SRS resource 1 is 2 and that a starting position (startPosition) of SRS resource 2 is 3 and the number of symbols (nrofSymbols) of SRS resource 2 is 2. It is assumed that a base station transmitted DCI triggering a corresponding SRS resource set to a terminal and that the 8th symbol to the 14th symbol were indicated for an available symbol resource in a slot through i) or ii) in corresponding DCI. In this case, the 8th symbol to the 14th symbol may be re-indexed to symbol index 0 to 6 which may be sequentially used (i.e., index 0 to 6 to which a starting position (startPosition) can be applied). Accordingly, a terminal may transmit SRS resource 1 through the 8th symbol and the 9th symbol (i.e., 2 symbols) by applying the starting position (startPosition) 0 of SRS resource 1, in a re-indexed (available) resource. In addition, a terminal may transmit SRS resource 2 through the 11th symbol and the 12th symbol (2 symbols) by applying the starting position (startPosition) 3 of SRS resource 2, in a re-indexed resource.

Through an operation of the proposal 2-3, when a base station recognizes that an additional SRS collides with another UL channel or another SRS (or an UL channel/a RS of another UE) in the same UL slot (e.g., a symbol level collision), there is an advantage of facilitating flexible resource allocation by dynamically indicating an available (or unavailable) symbol resource in a slot when triggering an additional SRS.

Suggestion 2-4: A Method of indicating/updating a slot offset (slotOffset) through a specific field other than an SRS request field in triggering an SRS through DCI A base station may indicate or update a slot offset (slotOffset) through a DCI specific field when triggering an (aperiodic) SRS resource set through DCI to enhanced UE (e.g., through an SRS request field in DCI). In this case, a slot offset (slotOffset) may mean a time interval (or a slot interval) from a transmission/reception time (slot) of DCI triggering a corresponding SRS resource set to a time/(slot) transmitting a corresponding SRS resource set.

Through the operation, when a base station recognizes that an additional SRS collides with another UL channel or another SRS (or an UL channel/a RS of another UE) in the same UL slot (e.g., a symbol level collision), there is an advantage of facilitating flexible resource allocation by dynamically indicating/updating a slot which will transmit an additional SRS (i.e., a non-colliding UL slot).

An indicating/updating operation for the slot offset (slotOffset) may be applied to an (aperiodic) SRS resource set triggered through DCI in a one-time/one-off way. In other words, although a slot offset (slotOffset) is applied to a first (aperiodic) SRS resource set triggered by first DCI, and subsequently, although a corresponding first (aperiodic) SRS resource set is re-triggered by another second DCI, the slot offset (slotOffset) may not be applied. In other words, a slot offset (slotOffset) needs to be indicated again by second DCI. In addition, a slot offset (slotOffset) may not be changed for an (aperiodic) SRS resource set which is not triggered by the DCI.

Alternatively, an indicating/updating operation for the slot offset (slotOffset) by a configuration/an indication of a base station may configure/indicate semi-permanent update of a slot offset (slotOffset) in a corresponding SRS resource set (until RRC/MAC CE/DCI are additionally updated). In this case, when a terminal normally decodes the DCI, a terminal may apply an updated slot offset (slotOffset) when transmitting an (aperiodic) SRS resource set subsequently. In other words, regardless of whether transmission of a specific SRS resource set is triggered by DCI, a slot offset (slotOffset) for the specific SRS resource set may be updated. For example, it is assumed that a slot offset (slotOffset) value is indicated through the specific field to DCI and at the same time, that a codepoint of an SRS request field of corresponding DCI is '00' (i.e., no SRS transmission triggering). In this case, when there is an (aperiodic) SRS resource set which is associated/linked/configured by RRC description in a corresponding codepoint, a terminal may (update and) apply a slot offset (slotOffset) value for the corresponding SRS resource set.

Proposal 3: A method of triggering 2 or more different aperiodic SRS resource sets through one DCI or/and a method of triggering 1 aperiodic SRS (AP-SRS) resource set by multi-shots (i.e., multiple transmission) through one DCI In a TDD system (or a slot configuration configured as a TDD configuration or a slot format indicator (SFI)), when a terminal is configured/indicated to transmit an additional SRS, an operation which transmits an SRS by delaying/shifting an SRS to an UL slot that a terminal can transmit an SRS may be supported for enhanced UE by considering a limited UL slot (in the same way as LTE). In other words, for an aperiodic SRS, regardless of a slot offset configured in a corresponding SRS resource set or although a slot after a slot offset from a triggered time is not an UL slot, an SRS may be delayed/shifted to an UL slot in which the SRS can be transmitted. Hereinafter, for convenience of description, the operation is referred to as 'operation 3-A'.

This proposal 3 proposes a method which triggers a plurality of (aperiodic) SRS resource sets with one DCI triggering, or triggers a single (aperiodic) SRS resource set but configures/indicates multi-shot transmission across multiple slots to reduce a DCI overhead.

Proposal 3-1: A method of triggering a plurality of (aperiodic) SRS resource sets with one DCI triggering A base station, through a higher layer configuration (e.g., a RRC configuration), may configure so that 2 or more different (aperiodic) SRS resource sets are linked/associated (through RRC description) to a specific codepoint of an SRS request field in DCI for a specific BWP of a specific cell. In this case, a terminal may expect that a different slot offset (slotOffset) value will be configured for the 2 or more different (aperiodic) SRS resource sets. Here, 2 or more different (aperiodic) SRS resource sets which may be linked/associated to a specific codepoint of the SRS request field may be limited to SRS resource set(s) having the same 'usage' value. In other words, common 'usage' of the (aperiodic) SRS resource set may be a 'codebook', a 'non-codebook', 'beam management', 'antenna switching' or/and 'positioning', etc.

For example, a base station may indicate enhanced UE to transmit a plurality of SRS resource sets (2 or more) for 'beam management' with one DCI transmission. Accordingly, a base station may determine the optimum UL beam in a shorter time by measuring reference signal received power (RSRP) quality for more UL (analog) beams. In this case, the different SRS resource sets for 'beam management' may be used for an UL beam management operation based on mutual understanding/configuration between a base station and a terminal which are UL beams transmitted from different panels of an enhanced terminal. More specifically, for triggering DCI, different SRS resource sets linked/associated to one codepoint may be transmitted from different UL panels of a terminal. As such SRS resource set(s) are linked/associated to one codepoint as a form of an ordered pair, a corresponding order may mean UE panel n and panel n+1. In other words, SRS resource set(s) associated with one codepoint may be mapped to different UE panels in a predetermined order. Here, for convenience of description, it is described by assuming 2 SRS resource sets and 2 panels, but it is not limited thereto. As an example of such an implicit panel indication, a first SRS resource set in an ordered pair as n=1 may be transmitted from UE panel 1 and a second SRS resource set in an ordered pair as n+1 may be transmitted from UE panel 2. Alternatively, as an indicator for a UE panel is configured in a SRS resource set configuration or a SRS resource configuration (e.g., as existing as a 'panel identifier (P-ID)' in the configuration) in a SRS configuration of enhanced UE, a SRS may be explicitly indicated to be transmitted per each of multiple panels of UE. In other words, a panel may be explicitly mapped per specific SRS resource set or per specific SRS resource.

In another example, a base station may indicate enhanced UE to transmit a plurality of SRS resource sets (2 or more) for 'antenna switching (antennaSwitching)' with one DCI transmission. Accordingly, a base station may switch all antennas for a terminal having more Rx antennas. In a specific example, an antenna switching configuration such as xT6R (x Tx antennas selected from 6 Rx antennas, in this case, x is up to 4) or xT8R (x Tx antennas selected from 8 Rx antennas, in this case, x is up to 4) is assumed. In this case, a base station may trigger transmission of a plurality of SRS resource sets (2 or more) for 'antennaSwitching' to a terminal with one DCI. When all of the 6 Rx antennas or/and 8 Rx antennas may not be switched and sounded in 1 slot according to the number of symbols configured in one SRS resource (e.g., a Rx antenna port) in a SRS resource set, all terminal Rx antennas may be configured/indicated to perform full sweeping by configuring to have a different slot offset value for each of a plurality of different SRS resource sets. In particular, for antenna switching of a 1T6R or 1T8R configuration, a case may occur that full sweeping may not be performed even in 2 slots according to the number of symbols configured in an SRS resource in an SRS resource set. Accordingly, it may be effective that a base station triggers 2 or more SRS resource sets for 'antennaSwitching' at a time. In addition, the 2 or more different SRS resource sets for 'antenna switching (antennaSwitching)' may be transmitted from different UL panels of a terminal by a base station configuration (on/off for whether a different SRS resource set is transmitted from different panels). As such SRS resource set(s) are linked/associated to one codepoint as a form of an ordered pair, a corresponding order may mean UE panel n and panel n+1. In other words, SRS resource set(s) associated with one codepoint may be mapped to different UE panels in a predetermined order. In this case, for convenience of description, it is described by assuming 2 SRS resource sets and 2 panels, but it is not limited thereto. As an example of such an implicit panel indication, a first SRS resource set in an ordered pair as n=1 may be transmitted from UE panel 1 and a second SRS resource set in an ordered pair as n+1 may be transmitted from UE panel 2. Alternatively, as an indicator for a UE panel is configured in a SRS resource set configuration or a SRS resource configuration (e.g., as existing as 'P-ID' in the configuration) in a SRS configuration of enhanced UE, a SRS may be explicitly indicated to be transmitted per each of multiple panels of UE. In other words, a panel may be explicitly mapped per specific SRS resource set or per specific SRS resource.

In another example, a base station may indicate enhanced UE to transmit a plurality of SRS resource sets (2 or more) for 'a codebook' or 'a non-codebook' with one DCI transmission. Accordingly, a base station may perform UL link adaptation for different panels in a shorter time. In this case, the different SRS resource sets for 'a codebook' or 'a non-codebook' may be used for an UL link adaptation operation based on mutual understanding/configuration between a base station and a terminal which is an UL beam from different panels of an enhanced terminal. More specifically, for triggering DCI, a different SRS resource set linked/associated to one codepoint may be transmitted from different UL panels of a terminal. As such SRS resource set(s) are linked/associated to one codepoint as a form of an ordered pair, a corresponding order may mean UE panel n and panel n+1. In other words, SRS resource set(s) associated with one codepoint may be mapped to different UE panels in a predetermined order. In this case, for convenience of description, it is described by assuming 2 SRS resource sets and 2 panels, but it is not limited thereto. As an example of such an implicit panel indication, a first SRS resource set in an ordered pair as n=1 may be transmitted from UE panel 1 and a second SRS resource set in an ordered pair as n+1 may be transmitted from UE panel 2. Alternatively, as an indicator for a UE panel is configured in a SRS resource set configuration or a SRS resource configuration (e.g., as existing as 'P-ID' in the configuration) in a SRS configuration of enhanced UE, a SRS may be explicitly indicated to be transmitted per each of multiple panels of UE. In other words, a panel may be explicitly mapped per specific SRS resource set or per specific SRS resource.

In the above-described proposal 3-1, when a plurality of (aperiodic) SRS resource sets are triggered by one DCI triggering, different slot offset (slotOffset) values may be configured for a plurality of different (aperiodic) SRS resource sets. However, an SRS resource set (resources) having a shorter slot offset (slotOffset) value by the above-described operation 3-A may collide with an SRS resource set (resources) having a longer slot offset (slotOffset) value by a delay/a shift. In this case, when different SRS resource sets (resources) are not overlapped at a symbol level in the same slot (i.e., when even any one symbol is not overlapped), all SRS resource sets (resources) may be transmitted in a corresponding slot.

On the other hand, when the different SRS resource sets (resources) are overlapped at a symbol level in the same slot (i.e., when at least one symbol is overlapped), an SRS resource set (resources) having a shorter slot offset (slotOffset) value may be transmitted in a corresponding slot. In addition, transmission of an SRS resource set (resources) having a longer slot offset (slotOffset) value may be performed by a shift/a delay in a subsequent valid UL slot after a corresponding slot. Alternatively, in transmission of an SRS resource set (resources) having a corresponding longer slot offset (slotOffset) value, it may be transmitted only in remaining symbols except for a symbol overlapped in the slot. Alternatively, SRS transmission itself for an SRS resource set (resources) having a corresponding longer slot offset (slotOffset) value may be dropped.

An operation for preventing a collision between different SRS resource sets of the above-described terminal is not limited to a case in which a plurality of (aperiodic) SRS resource sets are triggered by one DCI triggering in proposal 3-1. In other words, it may be also applied to prevent a collision of the same SRS resource set triggered by different DCI and it may be also applied to prevent a collision between different SRS resource sets triggered by different DCI. More specifically, when the same or a different SRS resource set triggered by different DCI collides due to operation 3-A, an SRS resource set triggered by antecedent DCI may be preferentially transmitted. Alternatively, an SRS resource set triggered to perform transmission in an earlier slot based on a value of (a slot position receiving triggering DCI+a configured slot offset (slotOffset)) may be preferentially transmitted.

Conversely, a case in which the operation 3-A is not followed in the above-described proposal 3-1 will be described. A different slot offset (slotOffset) value is configured for the plurality of different (aperiodic) SRS resource sets, but in DCI triggering, any one SRS resource set may not be located in a valid UL slot. In other words, a slot corresponding to a value of (a slot position receiving triggering DCI+a configured slot offset (slotOffset)) for any one first SRS resource set may not be a valid UL slot. In this case, when a slot corresponding to a value of (a slot position receiving triggering DCI+a configured slot offset (slotOffset)) for any one second SRS resource set is a valid UL slot, a terminal may transmit (all) first and second (aperiodic) SRS resource sets in the corresponding valid UL slot at a time. When a symbol level position of SRS resource(s) included in different (aperiodic) SRS resource set(s) is overlapped in the operation (i.e., when at least any one symbol is overlapped), a terminal may transmit a second SRS resource set having a valid slot offset (slotOffset) and drop a remaining first SRS resource set. Alternatively, a base station may indicate which set of a slot offset (slotOffset) (among different SRS resource sets) is applied to a terminal through a corresponding DCI specific field. In other words, for avoiding an invalid UL slot, a base station may indicate a slot offset (slotOffset) of a specific SRS resource set which should be applied so that a terminal can transmit a different SRS resource set in a valid UL slot.

Proposal 3-2: A method of triggering one (aperiodic) SRS resource set with one DCI triggering to transmit it multiple (multi-shot) times across multiple slots Option 1) When triggering an (aperiodic) SRS resource set through DCI, a base station may indicate a terminal to transmit a corresponding (aperiodic) SRS resource set of corresponding DCI n times (n is a natural number). For example, it may be indicated by a specific field of corresponding DCI. In addition, for example, for proposal 3-2, despite an aperiodic SRS resource configuration, a parameter for a SRS periodicity and/or offset configuration (e.g., SRS-PeriodicityAndOffset) (which does not exist in the existing aperiodic SRS resource configuration) is defined, so a base station may configure/indicate a corresponding value through higher layer signaling or dynamic signaling. In other words, when a corresponding aperiodic SRS resource (set) is DCI-triggered by a base station to be transmitted n times, a terminal may transmit a corresponding aperiodic SRS resource (set) at a periodicity based on the configured SRS-PeriodicityAndOffset value. For example, an indication for the n transmission may be indicated by a field separate from an SRS request field for triggering DCI and a field for indicating a symbol level offset value of the proposal 2-2. Alternatively, as joint encoding is performed for a field for indicating a symbol level offset value of the proposal 2-2, a base station may indicate to a terminal a symbol level offset value and a value of n for n transmission at the same time through a corresponding field. In other words, a pair of a symbol level offset value and a value of n for n transmission may be indicated per codepoint of a joint-encoded field. Alternatively, all symbol level offset values in a field for indicating a symbol level offset value may be allocated to codepoints and the value of n may be allocated to remaining codepoints. In this case, one symbol level offset value or a value of n for n transmission may be indicated per codepoint.

Alternatively, if a base station indicates a terminal to transmit a corresponding (aperiodic) SRS resource set n times through corresponding DCI (e.g., through a specific field in DCI) when triggering an (aperiodic) SRS resource set through DCI, a terminal may repeatedly transmit a corresponding SRS resource set in n consecutive (valid) UL slot(s) based on a first valid UL slot after a pre-configured slot offset (slotOffset) (in this case, a first valid UL slot may be determined by including a slot according to a slot offset).

In the above-described embodiments, a value of n for n transmission of an SRS may be configured/updated by MAC CE or RRC. For example, a value of n, the number of repetitive transmission, may be configured in an (aperiodic) SRS resource set configuration.

Option 2) for a value of SRS-PeriodicityAndOffset, a parameter configuring periodicity and an offset value in an SRS resource set by enhancing the existing semi-persistent SRS resource set configuration, for example, periodicity of 1 ms may be configured. In addition, when a base station triggers a SP (semi-persistent)-SRS resource set that periodicity of 1 ms is configured through DCI, a terminal may transmit a corresponding SRS resource set n times as in the above-described Option 1. Here, 1 ms may correspond to a case in which a duration of a subframe/a slot, a transmission unit when transmitting an SRS 1 time, is 1 ms. In other words, when a duration of a subframe/a slot, a transmission unit when transmitting an SRS 1 time, is t [ms], a value of t [ms] may be configured by the SRS-PeriodicityAndOffset. A value of n may be configured in the semi-persistent SRS resource set configuration and may be updated by MAC CE or RRC signaling. In addition, for the semi-persistent SRS resource set, a slot offset (slotOffset) value configured in an aperiodic SRS despite a SP-SRS may be configured. In other words, when the SP-SRS is triggered, a terminal may repeatedly transmit a corresponding SRS resource set in n consecutive (valid) UL slot(s) based on a first valid UL slot after a slot offset (slotOffset) value (in this case, a first valid UL slot may be determined by including a slot according to a slot offset) after receiving DCI.

Alternatively, when a base station triggers a corresponding SP-SRS resource set through DCI, a terminal may start to repeatedly transmit a corresponding SRS resource set in (valid) UL slot(s) from a (valid) UL slot after a slot offset (slotOffset) value (in this case, a first valid UL slot may be determined by including a slot according to a slot offset) after receiving DCI. In addition, subsequently, when re-receiving DCI triggering the SP-SRS resource set, a terminal may stop the repetitive transmission of an SRS. In other words, the number of repetitive transmission of an SRS may be controlled by DCI and a value of n, the number of the repetitive transmission, may not be pre-configured. For a stop point, a terminal may transmit an SRS resource set until a slot offset (slotOffset) value (or, until a slot according to a slot offset) after re-receiving DCI triggering the SP-SRS resource set (i.e., receiving DCI indicating stop) and may stop transmission subsequently.

For the above-described Option 1 and Option 2, a base station may configure/indicate whether an antenna and/or a panel will be switched and transmitted when repeatedly transmitting an SRS resource set through a separate configuration in a SRS resource set or a separate indication of triggering DCI. In other words, when antenna switching or/and panel switching is configured/indicated to be on (i.e., activated) by the configuration/indication, a terminal performs transmission by switching an antenna or/and a panel per SRS resource set transmission. Conversely, when antenna switching or/and panel switching is configured/ indicated to be off (i.e., deactivated), a terminal performs repetitive transmission with the same antenna or/and panel per SRS resource set transmission.

Even in NR up to the existing Rel-16, a base station may be configured to transmit an SRS with periodicity several times for a certain period to a terminal through activation/ deactivation of a semi-persistent SRS resource set. However, such an operation is indicated to a terminal through a MAC CE message, so it may be an outdated method with regard to latency compared with what is indicated by DCI as in the proposal 3-2. In addition, through a method of the proposal 3-2, there is an advantage to prevent waste of an indiscreet activation/deactivation MAC CE message.

The above-described proposal 3-1 and 3-2 may be independently applied/implemented or may be applied/implemented in a form that two operations of proposal 3-1 and proposal 3-2 are combined.

When an operation based on at least one of the embodiments (e.g., at least one of proposal 1/proposal 2/proposal 3) is performed, a terminal may transmit a corresponding SRS by utilizing a flexible symbol when an UL slot of timing transmitting an additional SRS (by DCI triggering) is a flexible slot or/and when a symbol transmitting a SRS in a corresponding UL slot is overlapped with a flexible symbol. However, when transmission of another DL channel or UL channel is configured/indicated/scheduled in advance in a corresponding flexible symbol to collide with an SRS, a terminal may drop a SRS.

FIG. 8 is a diagram illustrating a signaling procedure between a base station and a terminal for a method of transmitting and receiving a sounding reference signal according to an embodiment of the present disclosure.

FIG. 8 illustrates a signaling procedure between a terminal and a base station based on the above-proposed proposal 1 to proposal 3. An example in FIG. 8 is for convenience of description, and it does not limit a scope of the present disclosure. Some step(s) illustrated in FIG. 8 may be omitted according to a situation and/or a configuration. In addition, in FIG. 8, a base station and a terminal are just one example and may be implemented by an apparatus illustrated in the following FIG. 13. For example, a processor 102/202 in FIG. 13 may control to transmit and receive a channel/a signal/data/information, etc. (e.g., SRS-related configuration information, DCI for UL/DL scheduling, an additional SRS, a PDCCH, a PDSCH, a PUSCH, a PUCCH, a PHICH, etc.) by using a transceiver 106/206 and may control to store a channel/a signal/data/information, etc. to be transmitted or received in a memory 104/204.

In reference to FIG. 8, a base station (BS) may transmit SRS-related configuration information to user equipment (UE) (S801).

Here, UE may receive SRS-related configuration information from a base station.

In this case, as in the above-described proposal 1 to proposal 3, SRS-related configuration information may include configuration information related to SRS transmission, configuration information on one or more SRS resource sets (i.e., N (N is a natural number) SRS resource sets), etc., and each SRS resource set may include one or more SRS resources, and accordingly, configuration information may include configuration information on one or more SRS resources.

In addition, configuration information may include a usage value per SRS resource set (or per SRS resource). In this case, usage may include a codebook, a non-codebook, beam management, antenna switching (antennaSwitching) or/and positioning, etc.

In addition, configuration information may include time domain behavior (i.e., periodic transmission, aperiodic transmission, semi-persistent transmission) information per SRS resource set (or per SRS resource).

As in the above-described proposal 1, configuration information for a legacy SRS configuration and configuration information for an additional SRS configuration may be distinguished and transmitted to UE.

In addition, as in the above-described proposal 2, the configuration information (in particular, configuration information for an additional SRS) may include symbol level starting position (startposition) information of SRS transmission in a slot and/or information on the number of symbols (nrofsymbols) for SRS transmission in a slot per SRS resource set (or per SRS resource in an SRS resource set).

In addition, the configuration information (in particular, configuration information for an additional SRS) may include slot offset information per SRS resource set (or per SRS resource). Here, a slot offset may mean an interval for a slot that the triggered SRS resource set (or SRS resource) is transmitted from a slot that DCI triggering transmission of an SRS resource set (or an SRS resource) is transmitted.

In addition, the configuration information (in particular, configuration information for an additional SRS) may include mapping information on an SRS resource set (or an SRS resource) and a codepoint triggering transmission of an SRS in DCI per each SRS resource set (or per SRS resource) and/or mapping information between a UE panel and an SRS resource set (or an SRS resource) mapped to the codepoint. Alternatively, such mapping information may be defined in advance by a specific rule.

In addition, as in the above-described proposal 3, the configuration information (in particular, configuration information for an additional SRS) may include periodicity and offset information for aperiodic SRS resource set (or SRS resource).

A base station may transmit DCI related to SRS transmission (triggering SRS transmission) to UE (through a PDCCH) (S802).

In other words, UE may receive DCI related to SRS transmission (triggering SRS transmission) from a base station (through a PDCCH).

DCI may include information (a field) which triggers SRS transmission for one or more SRS resource sets (i.e., M (M≤N, M is a natural number) SRS resource sets) among one or more SRS resource sets configured in Step S801 above (i.e., N SRS resource sets).

As in the above-described proposal 2, a symbol level offset for one or more SRS resource sets may be indicated by DCI and transmission of the SRS in a slot may be determined as a symbol level offset is applied to a starting position configured by the S801 configuration information. Here, one or more SRS resource sets that a symbol level offset is indicated by DCI are not limited to a SRS resource set triggered by the DCI.

In addition, an available symbol in a slot may be indicated by DCI and in this case, a symbol index of an available symbol may be re-indexed sequentially. In addition, a starting position and/or the number of slots configured in the step S801 may be applied in an available symbol that a symbol index is re-indexed.

In addition, as in the above-described proposale 3, a plurality of SRS resource sets may be mapped/associated/linked to each codepoint in a field which triggers SRS transmission in DCI. In addition, a plurality of SRS resource sets mapped/associated/linked to a codepoint may be mapped to different panels of a terminal in a predetermined order.

In addition, as in the above-described proposal 3, an SRS for one SRS resource set may be indicated to be transmitted by the DCI multiple (multi-shot) times across multiple slots.

In addition, it is not illustrated in FIG. 8, but a base station may transmit MAC CE related to SRS transmission to UE. In other words, UE may receive MAC CE related to SRS transmission from a base station.

In this case, MAC CE related to SRS transmission may include information for updating a symbol level starting position value of SRS transmission in a slot.

UE may transmit an SRS to a base station based on received SRS-related configuration information and DCI (S803). In other words, a base station may receive an SRS from the UE.

In this case, as in the proposal 2, UE may perform the SRS transmission based on a symbol level starting position and/or the number of symbols in a slot configured for a triggered SRS resource set (or an SRS resource in an SRS resource set). In addition, when a symbol level offset for a symbol level starting position in a slot is indicated for an SRS resource set (or an SRS resource in an SRS resource set) in DCI, a terminal may perform SRS transmission in a symbol determined based on a symbol level offset.

In addition, as in the proposal 2, when an available symbol in a slot is indicated by DCI, SRS transmission may be performed by applying a starting position and/or the number of slots configured for an SRS resource set (or an SRS resource in an SRS resource set) triggered in an available symbol that a symbol index is re-indexed.

In addition, as in the proposal 3, when transmission of one or more SRS resource sets (i.e., M SRS resource sets) is triggered by the DCI, UE may transmit the SRS to a base station in an SRS resource of each of the M SRS resource sets.

Here, each of the M SRS resource sets may be related to different panels of the terminal.

When transmission of one or more SRS resource sets (i.e., M SRS resource sets) is triggered by the DCI, UE may perform SRS transmission respectively for corresponding slots by applying a configured slot offset to each SRS resource set, respectively. Here, as described above, regardless of a slot offset configured in a corresponding SRS resource set or although a slot after a slot offset from a triggered time is not an UL slot, an SRS may be delayed/shifted to an UL slot in which the SRS can be transmitted. Accordingly, when a different slot offset is configured, but SRSs for one or more SRS resource sets (i.e., M SRS resource sets) collides in at least one symbol in a first slot, a SRS for a SRS resource set that a shorter slot offset is configured may be transmitted in the first slot and a SRS for a SRS resource set that a longer slot offset is configured may be transmitted in an uplink slot in which the SRS can be transmitted after the first slot. Such an operation may be also applied to a case in which different SRS resource sets are triggered by different DCI and collides in the same symbol without being limited to a case in which multiple SRS resource sets are triggered by one DCI.

In addition, as in the proposal 3, when a SRS for one SRS resource set is indicated to be transmitted by one DCI multiple (multi-shot) times across multiple slots, UE may repeatedly transmit a SRS for a corresponding SRS resource set across multiple slots.

In addition, periodic and semi-persistent SRS transmission is not triggered by the DCI, so in this case, step S802 may be omitted.

Meanwhile, in NR MIMO Rel-17, it is expected that standardization of an additional (enhanced) SRS supporting more symbols in addition to the existing NR legacy SRS (i.e., up to 4 symbols may be configured as an SRS resource in last 6 symbols in a slot) will be performed. In other words, in order to enhance a capacity and coverage of a NR SRS as below, it is expected that multiple-symbol SRSs will be supported in a time domain space/resource (i.e., in a time domain region exceeding 4 symbols) except for last 6 symbols in a slot.

SRS Enhancement for both FR1 and FR2: Identifies and designates enhancement for aperiodic SRS triggering to promote more flexible triggering and/or a decrease in a DCI overhead/use Designates SRS switching for up to 8 antennas (e.g., xTyR, x={1, 2, 4} and y={6, 8})

The following mechanism(s) are evaluated to enhance an SRS capacity and/or coverage and if necessary, are designated: SRS time bundling, increased SRS repetitions, partial sounding across a frequency In this case, more SRS repetitions than R=4, the maximum repetition value of an SRS according to a Rel-15 operation, may be supported. However, in a TDD system, a major goal of a NR, due to a lack of UL slots, there is a limit when a large number of SRS repetitions are configured/indicated to one terminal. Therefore, a method that an SRS coverage is enhanced and UL channel estimation performance is improved by a small number of SRS repetitions is necessary.

Based on such a background, an SRS time domain bundling method which relates/associates an SRS and a UL DMRS is proposed below.

In the present disclosure, '/' may be interpreted as 'and', 'or' or 'and/or' according to a context.

FIG. 9 is a diagram illustrating downlink/uplink transmission timing in a wireless communication system to which the present disclosure may be applied.

FIG. 9(a) illustrates PDSCH and ACK/NACK timing and FIG. 9(b) illustrates PUSCH timing.

In reference to FIG. 9(a), when UE is scheduled to receive a PDSCH, m, a value of a field for assigning a time domain resource of corresponding DCI (i.e., a 'Time domain resource assignment' field), provides m+1, a row index of a predetermined PDSCH resource allocation-related table. Each row in a PDSCH resource allocation-related table defines a slot offset $K_0$, a start and length indicator (SLIV) (or, a direct start symbol S and an allocation length L) and a PDSCH mapping type assumed in PDSCH reception. When UE receives DCI scheduling a PDSCH in slot n, a value of $K_0$ is determined according to a row of a PDSCH resource allocation-related table indicated by m, a 'Time domain resource assignment' field value in corresponding DCI, and slot $K_s$ allocated for a PUSCH is determined based on an index (i.e., n) of a slot that DCI is received and a value of $K_0$.

Values of a field (i.e., a 'PDSCH-to-HARQ feedback timing indicator' field) for a timing indication of a PDSCH and HARQ feedback in DCI are mapped to values of a set of the number of slots provided by a higher layer parameter (e.g., 'dl-DataToUL-ACK', 'dl-DataToUL-ACK-r16'). In other words, among values of the number of slots provided by a higher layer parameter, a value of the number of specific slots (i.e., K) is determined by a 'PDSCH-to-HARQ feedback timing indicator' field value in DCI and a PUCCH slot carrying ACK/NACK for a PDSCH is transmitted in a slot after K from a PDSCH transmission slot (i.e., slot $K_s$+K).

In reference to FIG. 9(b), when UE is scheduled by DCI to transmit a transport block in a PUSCH, m, a value of a field for assigning a time domain resource of corresponding DCI (i.e., a 'Time domain resource assignment' field), provides m+1, a row index of a predetermined PUSCH resource allocation-related table. Each row in a PUSCH resource allocation-related table defines a slot offset $K_2$, a start and length indicator (SLIV)(or, a direct start symbol S and an allocation length L), a PUSCH mapping type assumed for PUSCH transmission and the number of repetitions. When UE receives DCI scheduling a PUSCH in slot n, a value of $K_2$ is determined according to a row of a PUSCH resource allocation-related table indicated by m, a 'Time domain resource assignment' field value in corresponding DCI, and slot $K_s$ allocated for a PUSCH is determined based on an index of a slot that DCI is received (i.e., n) and a value of $K_2$.

Hereinafter, in the present disclosure, 'a time domain bundling configuration/indication of an SRS and a DMRS' may be 'an indication which transmits an SRS port and a DMRS port on the same antenna port' and/or 'an indication which transmits an SRS port/resource and a DMRS port/resource with the same spatial relation or spatial domain (transmission) filter'.

In the present disclosure, 'a time domain bundling configuration/indication of an SRS and a DMRS' may be explicitly indicated by higher layer signaling (e.g., RRC signaling, MAC CE) or dynamic signaling (e.g., DCI). In this case, a specific SRS resource (or SRS resource set) and an UL DMRS that time domain bundling is indicated may be identified by signaling. Alternatively, a time domain bundling configuration/indication of an UL DMRS and an SRS may be indirectly indicated by dynamic signaling (e.g., DCI) which is described below. For example, an UL DMRS and an SRS are indicated to be adjacent by an indication of at least one of a PUCCH resource indicator field (PRI) in DCI, a SRS request field and a field for a PUSCH scheduling offset and a timing indication of a PDSCH and HARQ feedback, which may be considered as a time domain bundling indication of a DRMS and an SRS (i.e., interpreted by a terminal as a time domain bundling indication).

In addition, 'a time domain bundling configuration/indication of an SRS and a DMRS' may be configured/indicated by a base station only when frequency domain resource allocation of an SRS and a DMRS is fully or partially overlapped. Alternatively, for a corresponding bundling configuration of a base station, a terminal may perform a terminal operation related to the following time domain bundling only when frequency domain resource allocation of an SRS and a DMRS is fully or partially overlapped.

Proposal A: A base station may perform a SRS time domain bundling configuration/indication so that a terminal transmits an SRS and an UL DMRS adjacent in a time domain. Through a corresponding configuration/indication, when performing UL channel estimation through SRS reception, a base station may use a channel measure result value through UL DMRS reception with a channel estimation result value through SRS reception for UL channel estimation (or, reciprocity-based DL CSI acquisition, i.e., antenna switching).

Hereinafter, in the present disclosure, when the SRS is adjacent to the UL DMRS, it may mean that as SRS and an UL DMRS are respectively configured at a specific position.

For example, specifically, an SRS and an UL DMRS may be configured so that each position is based on at least one of the following i) to iii).

i) They are located in the same slot (in this case, an SRS in the same slot may be located in an earlier symbol, and vice versa.)

ii) They are located between adjacent slots (for example, an SRS is located in slot n and an UL DMRS is positioned in slot n+1, or vice versa.)

iii) The other is located in n symbols/slots from a location of any one of an SRS and an UL DMRS. (e.g., an UL DMRS is located in n symbols/slots from a location of an SRS, or vice versa.)

Here, the value of n may be configured/indicated/updated by a base station. For example, a value of n may be configured/indicated/updated by higher layer signaling (e.g., RRC signaling, MAC CE) or dynamic signaling (e.g., DCI).

In addition, the value of n may be differently configured/indicated/updated based on a channel state. For example, it may be configured/indicated/updated smaller by a base station when a channel is quickly changed by fading and it may be configured/indicated/updated larger by a base station when a channel is stable. There is an advantage of optimizing bundling performance according to a channel state through such an operation.

Effective resource management may be performed under a situation where UL resources (e.g., an UL slot) are insufficient (in a TDD scenario) by reducing the number of repetitions of an SRS through an operation which associates the SRS and UL DMRS.

The SRS may be at least one of an SRS for 'a codebook', for 'a non-codebook', for 'antenna switching' and for 'beam management' (i.e., an SRS resource in an SRS resource set).

Proposal A-1: A base station may use/indicate a PUCCH DMRS as an UL DMRS used for the time domain bundling. In other words, a PUCCH DMRS may be used as an UL DMRS used for the time domain bundling.

The PUCCH DMRS may correspond to at least one of a DMRS of a HARQ ACK/NACK PUCCH and a CSI Reporting PUCCH.

For example, when the PUCCH DMRS is a HARQ ACK/NACK PUCCH, a base station may perform PDSCH scheduling by transmitting DCI format 1_1, non-fallback DL DCI, to a terminal and may indicate a terminal so that a periodic/semi-persistent SRS and an ACK/NACK PUCCH are adjacent through a PUCCH resource indicator (PM) field in the DCI format. More specifically, a resource position (e.g., a start symbol and a time duration (i.e., the number of symbols)) of a PUCCH carrying ACK information for the PUSCH may be determined in a table which is predetermined by an index calculated based on a PRI value in DCI scheduling the PDSCH. In addition, an SRS resource position (i.e., a start symbol, the number of symbols, a repetition factor, etc. of an SRS resource) may be configured by higher layer signaling per periodic/semi-persistent SRS resource. Accordingly, a base station may indicate a PRI value to a terminal so that a corresponding SRS and a PUCCH DMRS are adjacent based on a resource position of a periodic/semi-persistent SRS configured to a corresponding terminal.

In another example, a base station may perform PDSCH scheduling by transmitting DCI format 1_1 and may indicate a terminal so that an aperiodic SRS and an ACK/NACK PUCCH are adjacent through a PRI field and an SRS request field. More specifically, as described above, a resource position (e.g., a start symbol and a time duration (i.e., the number of symbols)) of a PUCCH carrying HARQ ACK information for the PDSCH may be determined in a table which is predetermined by an index calculated based on a PRI value in DCI scheduling the PDSCH. In addition, an aperiodic SRS resource set may be triggered by an SRS request field in DCI scheduling the PDSCH and in this case, an SRS resource set means a set of one or more SRS resources. A slot offset from triggering DCI may be configured per each SRS resource in an SRS resource set by higher layer signaling and in addition, as described above, an SRS resource position (i.e., a start symbol, the number of symbols, a repetition factor, etc. of an SRS resource) may be configured. Accordingly, a base station may indicate a PRI value and/or an SRS request field value to a terminal so that a corresponding SRS and a PUCCH DMRS are adjacent.

In addition, scheduling may be performed so that a periodic/semi-persistent SRS and a PUCCH DMRS are adjacent through an indication by a field for a timing indication of a PDSCH and a HARQ feedback in DCI scheduling a PDSCH (i.e., a 'PDSCH-to-HARQ_feedback timing indicator' field). And/or, a base station may indicate a PRI value and/or an SRS request field value to a terminal so that a corresponding SRS and a PUCCH DMRS are adjacent.

In addition, a spatial relation of an ACK/NACK PUCCH adjacent to an SRS (e.g., a spatial domain Tx filter/coefficient) and/or a precoder of a terminal may be configured/indicated/updated to be the same as an SRS by the PRI field. Alternatively, for example, one or more precoders may be configured by RRC signaling and a specific precoder of the one or more precoders may be indicated by DCI scheduling the PDSCH. In addition, when one or more precoders configured by RRC signaling need to be updated/modified, it may be updated by a MAC control element (CE). As it configures/activates/indicates SRS and PUCCH transmission utilizing the same spatial relation information or/and precoder, a base station may perform accurate UL channel estimation and enhance UL coverage based on an association with an UL DMRS despite a configuration/an indication of a small number of SRS repetitions.

Specifically, for example, the SRS may be at least one of an SRS for 'a codebook' or for 'beam management' (i.e., a 1-port SRS resource in an SRS resource set). In addition, the same spatial relation (e.g., a spatial domain Tx filter/coefficient) or/and terminal precoder as a corresponding SRS resource may be indicated by the PRI field, and based on it, a terminal may perform (1-port) ACK/NACK PUCCH transmission. In other words, a precoder of an ACK/NACK PUCCH which traditionally depends on terminal implementation may be configured/indicated/updated by a base station to be the same as a precoder of the SRS resource. Alternatively, only when SRS time domain bundling in this proposal is configured/indicated by a base station, a precoder of the PUCCH may be configured/indicated to be the same as the SRS.

In another example, when the PUCCH DMRS is a CSI reporting PUCCH, a base station may configure/activate/indicate transmission of a periodic/semi-persistent/aperiodic SRS to be adjacent to a corresponding CSI reporting PUCCH when a CSI reporting PUCCH is transmitted by a terminal while having a periodic/semi-persistent property. In this case, the SRS may be at least one of an SRS for 'a codebook' or for 'beam management' (a 1-port SRS resource in a resource set). In addition, as in the same as the above-described example, a spatial relation (e.g., a spatial domain Tx filter/coefficient) and/or a terminal precoder of a CSI reporting PUCCH may be configured/indicated/updated to be the same as the SRS. Alternatively, only when SRS time domain bundling in this proposal is configured/indicated by a base station, a precoder of the PUCCH may be configured/indicated to be the same as the SRS.

In other words, this embodiment proposes the following terminal/base station operation. A base station may perform a time domain bundling configuration/indication of the SRS and a (PUCCH) DMRS for a terminal. A terminal may operate as follows by a corresponding time domain bundling configuration/indication. A terminal may use spatial relation information for a bundled SRS as spatial relation information of a (PUCCH) DMRS by ignoring (or replacing) spatial relation-related information which is preconfigured for the (PUCCH) DMRS by RRC/MAC CE signaling.

Proposal A-2: A base station may use/indicate a PUSCH DMRS as an UL DMRS used for the time domain bundling. In other words, a PUSCH DMRS may be used as an UL DMRS used for the time domain bundling.

For example, a base station may perform PUSCH scheduling by transmitting DCI format 0_1, non-fallback UL DCI, for a terminal and may perform uplink scheduling by a PUSCH scheduling offset indication so that a periodic/semi-persistent SRS and a PUSCH are adjacent. More specifically, scheduling may be performed so that a periodic/semi-persistent SRS and a PUSCH DMRS are adjacent through an indication by a field for assigning a time domain resource in DCI scheduling a PUSCH (i.e., a 'Time domain resource assignment' field).

In another example, a base station may perform PUSCH scheduling by transmitting DCI format 0_1 and may indicate a terminal so that an aperiodic SRS and a PUSCH are adjacent through an SRS request field. More specifically, an aperiodic SRS resource set may be triggered by an SRS request field in DCI scheduling the PDSCH and in this case, an SRS resource set means a set of one or more SRS resources. A slot offset from triggering DCI may be configured per each SRS resource in an SRS resource set by higher layer signaling and in addition, as described above, an SRS resource position (i.e., a start symbol, the number of symbols, a repetition factor, etc. of an SRS resource) may be configured. Accordingly, a base station may indicate an SRS request field value to a terminal so that a corresponding SRS and a PUSCH DMRS are adjacent. And/or, a base station may perform scheduling so that an aperiodic SRS and a PUSCH DMRS are adjacent through an indication by a field for assigning a time domain resource in DCI scheduling a PUSCH (i.e., a 'Time domain resource assignment' field).

There may be a limit that the periodic/semi-persistent/aperiodic SRS and the PUSCH for the time domain bundling configuration/indication have the same spatial relation. Alternatively, according to a time domain bundling configuration/indication of the SRS and a (PUSCH) DMRS, a terminal may operate as follows. A terminal may use spatial relation information for a bundled SRS as spatial relation information of a (PUSCH) DMRS by ignoring (or replacing) spatial relation-related information which is preconfigured/indicated in a (PUSCH) DMRS by MAC/CE signaling and DCI.

Specifically, for example, the SRS may be at least one of a SRS for 'a codebook' or for 'a nonCodebook' (i.e., n-port (n is a natural number) SRS resources in an SRS resource set). More specifically, i) when the SRS is used for 'a codebook', the number of ports of the SRS resource may be configured/indicated to be the same as the number of ranks of the scheduled PUSCH, and ii) when the SRS is used for 'a nonCodebook', the same number of 1-port SRS resources as the number of ranks of the PUSCH may be configured in a SRS resource set for 'a nonCodebook'.

Alternatively, when SRS time domain bundling of this proposal is configured/indicated by a base station, the existing configuration of a SRS resource set configured for the 'codebook' or for a 'nonCodebook' may be overridden and a terminal may i-1) transmit an SRS resource having the same number of ports as the number of ranks of the scheduled PUSCH (for 'a codebook') or ii-1) may transmit the same number of 1-port SRS resources as the number of ranks of the PUSCH (for 'a nonCodebook'). In particular, for the SRS resource set configured for 'a nonCodebook', according to an SRS time domain bundling configuration/indication of this proposal, a terminal may operate as follows. A terminal may transmit an SRS by using the same precoding vector(s) as a PUSCH DMRS bundled as a transmission precoding vector of each 1-port SRS resource in transmitting an SRS resource set for 'a nonCodebook' (so that an SRS port index and a DMRS port index have a one-to-one correspondence). It is to perform time bundling by using a precoder used for n-rank PUSCH transmission for SRS resources for 'a nonCodebook'. Specifically, for non-codebook-based PUSCH transmission, a base station may schedule n-rank PUSCH transmission by indicating n specific SRS resources (of up to 4 SRS resources) in an SRS resource set for 'a nonCodebook' transmitted by a terminal before PUSCH transmission through an SRS resource indicator (SRI) field of UL grant DCI scheduling a corresponding PUSCH. In this case, when SRS resources for 'a nonCodebook' bundled with a PUSCH precoder are used as they are, it means that SRS precoding vectors used in transmitting n SRS resources indicated through an SRI field of the UL grant DCI is used as it is. In other words, traditionally, a terminal itself calculates to which precoder it will transmit an SRS resource for 'a nonCodebook' (by a base station configuration), but according to the operation, it may be interpreted that precoding vectors used when transmitting SRS resources for a previous 'nonCodebook' are used as they are when transmitting subsequent SRSs.

Through the above-described operation, a spatial relation and a precoder of an adjacent SRS and PUSCH DRMS may be transmitted equally. A base station may measure a channel state from a PUSCH DMRS which is actually received by using a pre-recognized (pre-configured/indicated) PUSCH DMRS sequence. Accordingly, this embodiment has an advantage to improve SRS reception performance by utilizing measurement of a PUSCH DMRS for SRS channel estimation.

ii) of the proposal A-2. When the SRS is for 'a nonCodebook', the following two methods may be applied as another example.

ii-2) When an SRS (resource set) for 'a nonCodebook' used for SRS time domain bundling is bundled with a PUSCH DMRS, a terminal may transmit as many PUSCH DMRSs as the number of 1-port SRS resources in an SRS resource set for a corresponding ' nonCodebook' when a base station configures/indicates an SRS time domain bundling operation to a terminal. For example, when the number of PUSCH DMRS ports indicated in UL DCI is 1 (e.g., port 0) and the number of SRS resources configured in an SRS resource set for a 'nonCodebook' to be bundled with a corresponding PUSCH DMRS is 4, a terminal transmits a rank 1 PUSCH to a PUSCH DMRS (port 0) indicated by corresponding DCI and performs rate matching for DMRS ports (in the example, port 1, 2, 3) which are not used as a PUSCH DMRS among (4) DMRS ports (e.g., port 0, 1, 2, 3) mapped one-to-one to (4) SRS resources for a 'nonCodebook'. As a result, it may be understood that port 0 (i.e., a DMRS of port 0) corresponds to an actual DMRS (port) for PUSCH transmission of a terminal and port 1, 2, 3 (i.e., a DMRS of port 1, 2, 3) is not used for PUSCH transmission, but is used to improve SRS channel estimation performance (for a 'nonCodebook') (or, a DMRS of port 0 may be used to improve SRS channel estimation performance). For the ii-1 operation overriding the existing configuration of the SRS resource set, when as many SRS resources in an SRS resource set (for a 'nonCodebook') as the number of DMRS ports configured/indicated for a PUSCH are transmitted, it may be effective in improving channel estimation performance only for as many SRS resources as the number of DMRS ports and it may be ineffective in improving channel estimation performance for remaining SRS resources. On the other hand, according to the ii-2 operation, by overcoming a disadvantage in i-1, it may be expected to improve channel estimation performance in all SRS resources. However, the ii-2 method may have a disadvantage that a DMRS overhead of a terminal increases.

ii-3) When SRS time domain bundling is configured/indicated by a base station, a terminal may perform an operation in the ii-1 (e.g., as many SRS resources in an SRS resource set (for a 'nonCodebook') as the number of DMRS ports are transmitted) by overriding the existing configuration of an SRS resource set configured for a 'nonCodebook'. In addition, an SRS resource may be transmitted while performing cycling so that an SRS resource in an SRS resource set (for a 'nonCodebook') transmitted at every PUSCH+SRS transmission occasion (TO) of a terminal that time domain bundling is performed is different. In other words, an operation that a terminal transmits an SRS while changing an SRS resource combination in an SRS resource set (for a 'nonCodebook') targeted for time domain bundling at every (PUSCH+SRS) TO (according to a time) is proposed. For example, a method that a terminal performs transmission by bundling a rank n PUSCH and the first to the n-th SRS resources in an SRS resource set (for a 'nonCodebook') at a first TO and by bundling a rank m PUSCH and the (n+1)-th to the (n+m)-th SRS resources in a SRS resource set (for a 'nonCodebook') at a second TO may be considered. As above, as a method that an SRS resource subject to time domain bundling per TO is determined and a first SRS resource is re-selected after a last SRS resource in a corresponding SRS resource set, an SRS resource may be cyclically selected in a corresponding SRS resource set.

Through such an operation, a base station may expect an effect of CE performance improvement for all SRS resources in an SRS resource set (for a 'nonCodebook') from a plurality of TOs (according to the passage of time). Of course, the operation needs to perform a DMRS port indication to a terminal to be the same as a port index of a cycled SRS resource when a base station indicates a PUSCH DMRS port for DCI in PUSCH scheduling. In other words, a different PUSCH DMRS port indication may be performed by a base station per PUSCH TO. Alternatively, according to a PUSCH DMRS port indication in UL DCI of a base station, a terminal may cycle and transmit an SRS resource so that a port of a (1-port) SRS resource corresponds to a PUSCH DMRS port indicated in DCI when transmitting an SRS resource in a bundled SRS resource set (for a 'nonCodebook').

The ii-3 operation may be utilized/applied in M-TRP PUSCH transmission. In an example, in SDM M-TRP PUSCH transmission dividing an uplink layer per TRP, an SRS time domain bundling operation may be configured/indicated to a terminal. In this case, only with a configuration that each TRP divides SRS resources in an SRS resource set (for a 'nonCodebook'), a bundling operation of a PUSCH DMRS and an SRS resource (for a 'nonCodebook') may be performed. A DMRS port of the M-TRP PUSCH and the SRS resource (for a 'nonCodebook') may have a one-to-one correspondence relation according to which TRP the SRS resource is directed to (or according to a related configuration/indication). In addition, when a corresponding DMRS port and the SRS resource (for a 'nonCodebook') are bundled and transmitted by a terminal, a base station may improve SRS channel estimation performance per TRP. In addition, for TDM M-TRP PUSCH transmission, when a base station configures/indicates bundling of a PUSCH towards to each TRP and an SRS to a terminal, the ii-3 operation may be applied.

Proposal B: In the proposal A-1 and A-2, for equivalent association of an SRS and an UL DMRS, a pre-configuration of a base station may be performed so that an (open-loop (OL)/closed-loop(CL)) power control configuration/indication of an SRS (resource set) is the same as an (OL/CL) power control configuration/indication of a UL(PUCCH/PUSCH) DMRS.

Alternatively, according to a time domain bundling configuration/indication of the SRS and a (PUCCH/PUSCH) DMRS, a terminal may operate as follows. A terminal may operate according to an (OL/CL) power control configuration of an SRS by ignoring (or overriding) the existing configuration for a PUCCH/PUSCH (OL/CL) power control configuration. Alternatively, for a power control process of two channels/RSs (reference signal) of an SRS and a PUCCH/a PUSCH targeted for time domain bundling, a configuration/an indication on whether to follow power control of an SRS or power control of a PUCCH/a PUSCH may be preceded in advance by a base station. Specifically, for a pathloss reference RS (and/or a coefficient alpha value for pathloss compensation), an OL power control parameter configured in each UL channel/RS for pathloss compensation in uplink transmission, a base station/a terminal may operate as follows. A base station performs a time domain bundling configuration/indication of the SRS and a (PUCCH/PUCCH) DMRS. According to a corresponding bundling configuration/indication, a terminal may ignore (or override) a pathloss reference RS which is pre-configured in a PUCCH/a PUSCH and perform pathloss compensation by utilizing a pathloss reference RS (and/or an alpha value) configured in an SRS to transmit a corresponding channel. Alternatively, for a pathloss reference RS (and/or an alpha value) of two channels/RSs of a PUCCH/a PUSCH and an SRS targeted for time domain bundling, a pre-configuration/indication of a base station on whether to follow a configuration of an SRS or a configuration of a PUCCH/a PUSCH may be preceded. Based on a corresponding configuration/indication, a terminal may compensate pathloss according to an SRS configuration or a PUCCH/PUSCH configuration.

An operation of the proposal A-1 and A-2 may be configured to be on/off (i.e., activated/deactivated) for a terminal operation by a different RRC enabler or an integrated RRC enabler.

The proposal A-1/proposal A-2/i/ii/i-1/ii-1/ii-2/ii-3/proposal B may be respectively performed by an independent operation or may be applied/utilized by a base station-terminal operation with a combination of a specific suggestion/operation.

FIG. 10 is a diagram illustrating a signaling procedure between a base station and a terminal for a method of transmitting and receiving an uplink signal according to an embodiment of the present disclosure.

FIG. 10 illustrates a signaling procedure between a base station and a terminal based on the above-proposed suggestion A (proposal A-1/proposal A-2/i/ii/i-1/ii-1/ii-2/ii-3) to proposal B. An example in FIG. 10 is for convenience of description, and it does not limit a scope of the present disclosure. Some step(s) illustrated in FIG. 10 may be omitted according to a situation and/or a configuration. In addition, in FIG. 10, a base station and a terminal are just one example, and may be implemented by an apparatus illustrated in the following FIG. 13. For example, a processor 102/202 of FIG. 13 may control to transmit and receive a channel/a signal/data/information, etc. (e.g., SRS-related configuration information, UL channel-related configuration information, DCI for UL/DL scheduling, an additional SRS, a PDCCH, a PDSCH, a PUSCH, a PUCCH, a PHICH, etc.) by using a transceiver 106/206 and may control to store a channel/signal/data/information, etc. to be transmitted or received in a memory 104/204.

In reference to FIG. 10, a base station (BS) may transmit SRS-related configuration information to user equipment (UE) (S1001). In other words, UE may receive SRS-related configuration information from a base station.

Here, SRS-related configuration information may include configuration information related to SRS transmission, configuration information on one or more SRS resource sets (i.e., N (N is a natural number) SRS resource sets), etc., and each SRS resource set may include one or more SRS resources, and accordingly, configuration information may include configuration information on one or more SRS resources.

In addition, SRS-related configuration information may include a usage value per SRS resource set (or per SRS resource). In this case, usage may include a codebook, a non-codebook, beam management, antenna switching or/and positioning, etc.

In addition, SRS-related configuration information may include time domain behavior (i.e., periodical transmission, aperiodic transmission, semi-persistent transmission) information per SRS resource set (or per SRS resource).

In addition, SRS-related configuration information may include precoder information and/or spatial relation information (e.g., a spatial domain Tx filter/a coefficient) per SRS resource set (or SRS resource). In addition, it may include a power control configuration of an open loop and/or a closed loop per SRS resource set (or SRS resource).

A base station (BS) may transmit UL channel-related configuration information to user equipment (UE) (S1002). In other words, UE may receive UL channel-related configuration information from a base station.

Here, an UL channel may be a PUCCH and/or a PUSCH.

UL channel-related configuration information may include precoder information and/or spatial relation information (e.g., a spatial domain Tx filter/a coefficient) of a corresponding UL channel (or a DRMS of a corresponding UL channel). In addition, UL channel-related configuration information may include a power control configuration of an open loop and/or a closed loop for a corresponding UL channel (or a DRMS of a corresponding UL channel).

A base station (BS) transmits DCI which triggers transmission of an SRS in one or more SRS resources in an SRS resource set configured to UE (i.e., a specific SRS resource of one or more SRS resource sets) to UE (S1003).

Here, DCI may schedule a PDSCH or may schedule a PUSCH.

In addition, DCI may indicate time domain bundling between the SRS and an uplink DMRS. In this case, an indication of time domain bundling between the SRS and an uplink DMRS may be an indication that the SRS and the uplink DMRS are transmitted on the same antenna port and/or with the same spatial domain transmission filter.

As described above, DCI may explicitly indicate the time domain bundling, or may indirectly/implicitly indicate the time domain bundling by indicating that a position between the SRS and an uplink DMRS is adjacent (i.e., it is located in a specific range in a time domain). Here, the specific range may include the same slot, a consecutive slot, n (n is a natural number) symbols and n (n is a natural number) slots.

A terminal transmits an uplink channel DMRS and the SRS in the one or more SRS resources to the base station (S1004).

A terminal may transmit the SRS and the uplink DMRS to a base station according to the time domain bundling indication. Here, an uplink DMRS may be transmitted temporarily before an SRS, or an SRS may be transmitted temporarily before an uplink DMRS.

The uplink DMRS subject to time domain bundling with the SRS may be a DMRS of a PUCCH carrying CSI or a DMRS of a PUCCH carrying ACK information (i.e., HARQ ACK) on a PDSCH scheduled by the DCI. In this case, as the uplink DMRS and the SRS are indicated to be located in the specific range in a time domain by an SRS request field and/or a PRI field in the DCI, time domain bundling between the SRS and the uplink DMRS may be indicated. In addition, in this case, precoder and/or spatial relation information for transmission of the SRS may be used for transmission of the uplink DMRS. In other words, precoder and/or spatial relation information configured for transmission of an uplink DMRS may be replaced with precoder and/or spatial relation information for transmission of the SRS.

The uplink DMRS subject to time domain bundling with the SRS may be a DMRS of a PUSCH scheduled by the DCI. In this case, as the uplink DMRS and the SRS are indicated to be located in the specific range in a time domain by a scheduling offset indication of the PUSCH by the DCI, time domain bundling between the SRS and the uplink DMRS may be indicated. In addition, in this case, spatial relation information for transmission of the SRS may be used for transmission of the uplink DMRS. In other words, spatial relation information configured for transmission of an uplink DMRS may be replaced with spatial relation information for transmission of the SRS. In addition, a precoder for transmission of the uplink DMRS may be used for transmission of the SRS. In addition, when the SRS resource set is configured for a codebook, the number of antenna ports of the one or more SRS resources may be configured the same as the number of ranks of the PUSCH. In addition, when the SRS resource set is configured for a non-codebook, the number of the one or more SRS resources in the SRS resource set may be configured the same as the number of ranks of the PUSCH. Here, one or more different SRS resources in the SRS resource set may be transmitted per transmission occasion of the time domain bundling. For example, a combination of SRS resources in the SRS resource set at a transmission occasion may be cyclically determined.

In addition, the same power control configuration of open loop and/or closed loop may be configured for the SRS and the uplink DMRS. Alternatively, a power control configuration of an open loop and/or closed loop for transmission of the SRS may be used for transmission of the uplink DMRS. In addition, whether the same power control configuration of open loop and/or closed loop between the SRS and the uplink DMRS will follow a power control configuration for an SRS or a power control configuration for the uplink DMRS may be configured by the base station. In this case, which power control configuration is followed may be configured by the SRS-related configuration information or uplink channel-related configuration information or may be indicated by dynamic signaling (e.g., DCI, etc.).

FIG. 11 is a diagram illustrating an operation of a terminal for transmitting and receiving an uplink signal according to an embodiment of the present disclosure.

FIG. 11 illustrates an operation of a terminal based on the above-proposed proposal A (proposal A-1/proposal A-2/i/ii/i-1/ii-1/ii-2/ii-3) to proposal B. An example in FIG. 11 is for convenience of description, and it does not limit a scope of the present disclosure. Some step(s) illustrated in FIG. 11 may be omitted according to a situation and/or a configuration. In addition, in FIG. 11, a terminal is just one example, and may be implemented by an apparatus illustrated in the following FIG. 13. For example, a processor 102/202 in FIG. 11 may control to transmit and receive a channel/a signal/data/information, etc. by using a transceiver 106/206 and may control to store a channel/a signal/data/information, etc. to be transmitted or received in a memory 104/204.

In addition, an operation of FIG. 11 may be processed by one or more processors 102, 202 in FIG. 13. In addition, an operation of FIG. 11 may be stored in a memory (e.g., one or more memories 104 and 204 of FIG. 13) in a form of a command/a program (e.g., an instruction, an executable code) for operating at least one processor of FIG. 13 (e.g., 102, 202).

In reference to FIG. 11, a terminal receives SRS-related configuration information from a base station (S1101).

Here, SRS-related configuration information may include configuration information related to SRS transmission, configuration information on one or more SRS resource sets (i.e., N (N is a natural number) SRS resource sets), etc., and each SRS resource set may include one or more SRS resources, and accordingly, configuration information may include configuration information on one or more SRS resources.

In addition, SRS-related configuration information may include a usage value per SRS resource set (or per SRS resource). In this case, usage may include a codebook, a non-codebook, beam management, antenna switching or/and positioning, etc.

In addition, SRS-related configuration information may include time domain behavior (i.e., periodical transmission, aperiodic transmission, semi-persistent transmission) information per SRS resource set (or per SRS resource).

In addition, SRS-related configuration information may include precoder information and/or spatial relation information (e.g., a spatial domain Tx filter/a coefficient) per SRS resource set (or SRS resource). In addition, it may include a power control configuration of an open loop and/or a closed loop per SRS resource set (or SRS resource).

In addition, it is not shown in FIG. 11, but a terminal may receive configuration information related to an uplink channel from a base station. In this case, the description in FIG. 10 may be referred to.

For an aperiodic SRS, a terminal may receive DCI which triggers transmission of an SRS in one or more SRS resources in an SRS resource set configured by SRS-related configuration information from a base station (S1102).

Here, DCI may schedule a PDSCH or may schedule a PUSCH.

In addition, DCI may indicate time domain bundling between the SRS and an uplink DMRS. In this case, an indication of time domain bundling between the SRS and an uplink DMRS may be an indication that the SRS and the uplink DMRS are transmitted on the same antenna port and/or with the same spatial domain transmission filter.

As described above, DCI may explicitly indicate the time domain bundling, or may indirectly/implicitly indicate the time domain bundling by indicating that a position between the SRS and an uplink DMRS is adjacent (i.e., it is located in a specific range in a time domain). Here, the specific range may include the same slot, a consecutive slot, n (n is a natural number) symbols and n (n is a natural number) slots.

A terminal transmits the SRS to the base station in the one or more SRS resources (S1103).

A terminal may transmit the SRS and the uplink DMRS to a base station according to the time domain bundling indication. Here, an uplink DMRS may be transmitted temporarily before an SRS, or an SRS may be transmitted temporarily before an uplink DMRS.

The uplink DMRS subject to time domain bundling with the SRS may be a DMRS of a PUCCH carrying CSI or a DMRS of a PUCCH carrying ACK information (i.e., HARQ ACK) on a PDSCH scheduled by the DCI. In this case, as the uplink DMRS and the SRS are indicated to be located in the specific range in a time domain by an SRS request field and/or a PRI field in the DCI, time domain bundling between the SRS and the uplink DMRS may be indicated. In addition, in this case, precoder and/or spatial relation information for transmission of the SRS may be used for transmission of the uplink DMRS. In other words, precoder and/or spatial relation information configured for transmission of an uplink DMRS may be replaced with precoder and/or spatial relation information for transmission of the SRS.

The uplink DMRS subject to time domain bundling with the SRS may be a DMRS of a PUSCH scheduled by the DCI. In this case, as the uplink DMRS and the SRS are indicated to be located in the specific range in a time domain by a scheduling offset indication of the PUSCH by the DCI, time domain bundling between the SRS and the uplink DMRS may be indicated. In addition, in this case, spatial relation information for transmission of the SRS may be used for transmission of the uplink DMRS. In other words, spatial relation information configured for transmission of an uplink DMRS may be replaced with spatial relation information for transmission of the SRS. In addition, a precoder for transmission of the uplink DMRS may be used for transmission of the SRS. In addition, when the SRS resource set is configured for a codebook, the number of antenna ports of the one or more SRS resources may be configured the same as the number of ranks of the PUSCH. In addition, when the SRS resource set is configured for a non-codebook, the number of the one or more SRS resources in the SRS resource set may be configured the same as the number of ranks of the PUSCH. Here, one or more different SRS resources in the SRS resource set may be transmitted per transmission occasion of the time domain bundling. For example, a combination of SRS resources in the SRS resource set at a transmission occasion may be cyclically determined.

In addition, the same power control configuration of open loop and/or closed loop may be configured for the SRS and the uplink DMRS. Alternatively, a power control configuration of an open loop and/or closed loop for transmission of the SRS may be used for transmission of the uplink DMRS. In addition, whether the same power control configuration of open loop and/or closed loop between the SRS and the uplink DMRS will follow a power control configuration for an SRS or a power control configuration for the uplink DMRS may be configured by the base station. In this case, which power control configuration is followed may be configured by the SRS-related configuration information or uplink channel-related configuration information or may be indicated by dynamic signaling (e.g., DCI, etc.).

FIG. 12 is a diagram illustrating an operation of a base station for transmitting and receiving an uplink signal according to an embodiment of the present disclosure.

FIG. 12 illustrates an operation of a base station based on the above-proposed proposal A (proposal A-1/proposal A-2/i/ii/i-1/ii-1/ii-2/ii-3) to proposal B. An example in FIG. 12 is for convenience of description, and it does not limit a scope of the present disclosure. Some step(s) illustrated in FIG. 12 may be omitted according to a situation and/or a configuration. In addition, in FIG. 12, a base station is just one example, and may be implemented by an apparatus illustrated in the following FIG. 13. For example, a processor 102/202 in FIG. 12 may control to transmit and receive a channel/a signal/data/information, etc. by using a transceiver 106/206 and may control to store a channel/a signal/data/information, etc. to be transmitted or received in a memory 104/204.

In addition, an operation of FIG. 12 may be processed by one or more processors 102 and 202 in FIG. 13. In addition, an operation of FIG. 12 may be stored in a memory (e.g., one or more memories 104 and 204 of FIG. 13) in a form of a command/a program (e.g., an instruction, an executable code) for operating at least one processor of FIG. 13 (e.g., 102, 202).

In reference to FIG. 12, a base station transmits SRS-related configuration information to a terminal (S1201).

Here, SRS-related configuration information may include configuration information related to SRS transmission, configuration information on one or more SRS resource sets (i.e., N (N is a natural number) SRS resource sets), etc., and each SRS resource set may include one or more SRS resources, and accordingly, configuration information may include configuration information on one or more SRS resources.

In addition, SRS-related configuration information may include a usage value per SRS resource set (or per SRS resource). In this case, usage may include a codebook, a non-codebook, beam management, antenna switching or/and positioning, etc.

In addition, SRS-related configuration information may include time domain behavior (i.e., periodical transmission, aperiodic transmission, semi-persistent transmission) information per SRS resource set (or per SRS resource).

In addition, SRS-related configuration information may include precoder information and/or spatial relation information (e.g., a spatial domain Tx filter/a coefficient) per SRS resource set (or SRS resource). In addition, it may include a power control configuration of an open loop and/or a closed loop per SRS resource set (or SRS resource).

In addition, it is not shown in FIG. 12, but a base station may transmit uplink channel-related configuration information to a terminal. In this case, the description of FIG. 10 may be referred to.

For an aperiodic SRS, a base station may transmit DCI which triggers transmission of an SRS in one or more SRS resources in a SRS resource set configured by SRS-related configuration information to a terminal (S1202).

In this case, DCI may schedule a PDSCH or may schedule a PUSCH.

In addition, DCI may indicate time domain bundling between the SRS and an uplink DMRS. In this case, an indication of time domain bundling between the SRS and an uplink DMRS may be an indication that the SRS and the uplink DMRS are transmitted on the same antenna port and/or with the same spatial domain transmission filter.

As described above, DCI may explicitly indicate the time domain bundling, or may indirectly/implicitly indicate the time domain bundling by indicating that a position between the SRS and an uplink DMRS is adjacent (i.e., it is located in a specific range in a time domain). Here, the specific range may include the same slot, a consecutive slot, n (n is a natural number) symbols and n (n is a natural number) slots.

A base station receives the SRS in the one or more SRS resources from a terminal S1203.

A terminal may transmit the SRS and the uplink DMRS to a base station according to the time domain bundling indication. Here, an uplink DMRS may be transmitted temporarily before an SRS, or an SRS may be transmitted temporarily before an uplink DMRS.

The uplink DMRS subject to time domain bundling with the SRS may be a DMRS of a PUCCH carrying CSI or a DMRS of a PUCCH carrying ACK information (i.e., HARQ ACK) on a PDSCH scheduled by the DCI. In this case, as the uplink DMRS and the SRS are indicated to be located in the specific range in a time domain by an SRS request field and/or a PRI field in the DCI, time domain bundling between the SRS and the uplink DMRS may be indicated. In addition, in this case, precoder and/or spatial relation information for transmission of the SRS may be used for transmission of the uplink DMRS. In other words, precoder and/or spatial relation information configured for transmission of an uplink DMRS may be replaced with precoder and/or spatial relation information for transmission of the SRS.

The uplink DMRS subject to time domain bundling with the SRS may be a DMRS of a PUSCH scheduled by the DCI. In this case, as the uplink DMRS and the SRS are indicated to be located in the specific range in a time domain by a scheduling offset indication of the PUSCH by the DCI, time domain bundling between the SRS and the uplink DMRS may be indicated. In addition, in this case, spatial relation information for transmission of the SRS may be used for transmission of the uplink DMRS. In other words, spatial relation information configured for transmission of an uplink DMRS may be replaced with spatial relation information for transmission of the SRS. In addition, a precoder for transmission of the uplink DMRS may be used for transmission of the SRS. In addition, when the SRS resource set is configured for a codebook, the number of antenna ports of the one or more SRS resources may be configured the same as the number of ranks of the PUSCH. In addition, when the SRS resource set is configured for a non-codebook, the number of the one or more SRS resources in the SRS resource set may be configured the same as the number of ranks of the PUSCH. Here, one or more different SRS resources in the SRS resource set may be transmitted per transmission occasion of the time domain bundling. For example, a combination of SRS resources in the SRS resource set at a transmission occasion may be cyclically determined.

In addition, the same power control configuration of open loop and/or closed loop may be configured for the SRS and the uplink DMRS. Alternatively, a power control configuration of an open loop and/or closed loop for transmission of the SRS may be used for transmission of the uplink DMRS. In addition, whether the same power control configuration of open loop and/or closed loop between the SRS and the uplink DMRS will follow a power control configuration for an SRS or a power control configuration for the uplink DMRS may be configured by the base station. In this case, which power control configuration is followed may be configured by the SRS-related configuration information or uplink channel-related configuration information or may be indicated by dynamic signaling (e.g., DCI, etc.).

General Device to which the Present Disclosure May be Applied

FIG. 19 is a diagram which illustrates a block diagram of a wireless communication system according to an embodiment of the present disclosure.

In reference to FIG. 19, a first device/wireless device 100 and a second device/wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat S1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE- A, 5G system, but may be applied to various wireless communication systems other than the 3GPP LTE/LTE-A, 5G system.

The invention claimed is:

1. A method of transmitting an uplink signal in a wireless communication, the method performed by a terminal, the method comprising:
receiving, from a base station, first configuration information related to a sounding reference signal (SRS) and second configuration information related to an uplink demodulation reference signal (DMRS);
transmitting, to the base station, the uplink DMRS for uplink transmission; and
transmitting, to the base station, the SRS in one or more SRS resources in an SRS resource set configured by the first configuration information,
wherein based on both i) the SRS and the uplink DMRS being configured to be located in a specific range in a time domain and ii) the SRS and the uplink DMRS being configured to fully or partially overlap in a frequency domain, time domain bundling between the SRS and the uplink DMRS is determined,
wherein even though a spatial domain transmission filter for transmitting the uplink DMRS is configured by the second configuration information, based on the time domain bundling between the SRS and the uplink DMRS being determined, the uplink DMRS is transmitted with a same spatial domain transmission filter as the SRS, and
wherein one of a first pathloss reference signal configured for the SRS or a second pathloss reference signal configured for the uplink transmission is used to determine transmission power of both the SRS and the uplink transmission.

2. The method of claim 1, wherein the specific range includes a same slot, consecutive slots, n symbols, or n slots, wherein n is a natural number.

3. The method of claim 2, wherein the uplink DMRS is a DMRS of a PUCCH (physical uplink control channel) carrying ACK (acknowledgement) information for a PDSCH (physical downlink shared channel) scheduled by downlink control information (DCI) or a DMRS of the PUCCH carrying channel state information (CSI).

4. The method of claim 3, wherein by indicating that the uplink DMRS and the SRS are located in the specific range in the time domain by at least one of an SRS request field or a PUCCH resource indication (PRI) field in the DCI, the time domain bundling between the SRS and the uplink DMRS is determined.

5. The method of claim 3, wherein at least one of a precoder or spatial relation information for transmission of the SRS is used for transmission of the uplink DMRS.

6. The method of claim 2, wherein the uplink DMRS is a DMRS of a PUSCH (physical uplink shared channel) scheduled by downlink control information (DCI).

7. The method of claim 6, wherein by indicating that the uplink DMRS and the SRS are located in the specific range in the time domain by a scheduling offset indication of the PUSCH by the DCI, the time domain bundling between the SRS and the uplink DMRS is determined.

8. The method of claim 6, wherein spatial relation information for transmission of the SRS is used for transmission of the uplink DMRS.

9. The method of claim 6, wherein a precoder for transmission of the uplink DMRS is used for transmission of the SRS.

10. The method of claim 6, wherein based on the SRS resource set being configured for a codebook, a number of antenna ports of the one or more SRS resources is configured a same as a number of ranks of the PUSCH.

11. The method of claim 6, wherein based on the SRS resource set being configured for a non-codebook, a number of the one or more SRS resources in the SRS resource set is configured a same as a number of ranks of the PUSCH.

12. The method of claim 11, wherein the one or more SRS resources in the SRS resource set are transmitted per transmission occasion of the time domain bundling.

13. The method of claim 6, wherein based on the SRS resource set being configured for a non-codebook, the uplink DMRS is transmitted as many as a number of the one or more SRS resources in the SRS resource set.

14. The method of claim 1, further including:
receiving downlink control information (DCI) triggering transmission of the SRS resource set.

15. The method of claim 1, wherein which one of the first pathloss reference signal configured for the SRS and the second pathloss reference signal configured for the uplink transmission used is configured by the base station.

16. A terminal of transmitting an uplink signal in a wireless communication, the terminal including:
one or more transceivers for transmitting and receiving a wireless signal; and
one or more processors controlling the one or more transceivers,
the one or more processors configured to:
receive, from a base station, first configuration information related to a sounding reference signal (SRS) and second configuration information related to an uplink demodulation reference signal (DMRS);
transmit, to the base station, the uplink DMRS for uplink transmission; and
transmit, to the base station, the SRS in one or more SRS resources in an SRS resource set configured by the first configuration information,
wherein based on both i) the SRS and the uplink DMRS being configured to be located in a specific range in a time domain and ii) the SRS and the uplink DMRS being configured to fully or partially overlap in a frequency domain, time domain bundling between the SRS and the uplink DMRS is determined,
wherein even though a spatial domain transmission filter for transmitting the uplink DMRS is configured by the second configuration information, based on the time domain bundling between the SRS and the uplink DMRS being determined, the uplink DMRS is transmitted with a same spatial domain transmission filter as the SRS, and
wherein one of a first pathloss reference signal configured for the SRS or a second pathloss reference signal configured for the uplink transmission is used to determine transmission power of both the SRS and the uplink transmission.

17. A method of receiving an uplink signal in a wireless communication, the method performed by a base station comprising:
transmitting, to a terminal first configuration information related to a sounding reference signal (SRS) and second configuration information related to an uplink demodulation reference signal (DMRS);
receiving, from the terminal, the uplink DMRS for uplink transmission; and receiving, from the terminal, the SRS in one or more SRS resources in an SRS resource set configured by the first configuration information, wherein based on both i) the SRS and the uplink DMRS being configured to be located in a specific range in a time domain and ii) the SRS and the uplink DMRS being configured to fully or partially overlap in a frequency domain, time domain bundling between the SRS and the uplink DMRS is determined, wherein even though a spatial domain transmission filter for transmitting the uplink DMRS is configured by the second configuration information, based on the time domain bundling between the SRS and the uplink DMRS being determined, the uplink DMRS is transmitted with a same spatial domain transmission filter as the SRS, and wherein one of a first pathloss reference signal configured for the SRS or a second pathloss reference signal configured for the uplink transmission is used to determine transmission power of both the SRS and the uplink transmission.

* * * * *